(12) United States Patent
Yung et al.

(10) Patent No.: US 7,624,244 B2
(45) Date of Patent: Nov. 24, 2009

(54) SYSTEM FOR PROVIDING A SLOW COMMAND DECODE OVER AN UNTRAINED HIGH-SPEED INTERFACE

(75) Inventors: ChiWei Yung, Highland, NY (US); Kevin C. Gower, LaGrangeville, NY (US)

(73) Assignee: International Business Machines Corporation, Armonk, NY (US)

(*) Notice: Subject to any disclaimer, the term of this patent is extended or adjusted under 35 U.S.C. 154(b) by 206 days.

(21) Appl. No.: 11/767,027

(22) Filed: Jun. 22, 2007

(65) Prior Publication Data

US 2008/0320265 A1 Dec. 25, 2008

(51) Int. Cl.
*G06F 12/00* (2006.01)
*G06F 13/14* (2006.01)

(52) U.S. Cl. .......................... 711/167; 711/105; 710/5; 710/58; 710/60

(58) Field of Classification Search ........................ None
See application file for complete search history.

(56) References Cited

U.S. PATENT DOCUMENTS

| | | |
|---|---|---|
| 4,723,120 A | 2/1988 | Petty, Jr. |
| 5,513,135 A | 4/1996 | Dell et al. |
| 5,623,687 A | 4/1997 | Yishay et al. |
| 5,652,844 A | 7/1997 | Harwood, III |
| 5,687,371 A | 11/1997 | Lee et al. |
| 5,938,728 A | 8/1999 | Swork et al. |
| 5,968,156 A | 10/1999 | Kim |
| 6,052,738 A | 4/2000 | Muller et al. |
| 6,125,463 A | 9/2000 | Macchi |
| 6,173,382 B1 | 1/2001 | Dell et al. |
| 6,182,192 B1 | 1/2001 | Rovati |
| 6,199,131 B1 | 3/2001 | Melo et al. |
| 6,452,848 B1 | 9/2002 | Obremski et al. |
| 6,510,100 B2 | 1/2003 | Grundon et al. |
| 6,571,346 B1 | 5/2003 | Dreps et al. |
| 6,587,912 B2 | 7/2003 | Leddige et al. |
| 6,671,753 B2 | 12/2003 | Dreps et al. |
| 6,731,607 B1 | 5/2004 | Mantin |
| 6,904,486 B2 | 6/2005 | Van Dyke et al. |
| 6,988,154 B2 | 1/2006 | Latta |
| 7,096,307 B2 | 8/2006 | Moyer |
| 2006/0036826 A1 | 2/2006 | Dell |
| 2006/0179369 A1 | 8/2006 | Bravo et al. |
| 2007/0011511 A1 | 1/2007 | Griseta et al. |
| 2008/0005455 A1* | 1/2008 | Macri et al. .................. 711/105 |

* cited by examiner

*Primary Examiner*—Jack A Lane
(74) *Attorney, Agent, or Firm*—Cantor Colburn LLP

(57) ABSTRACT

A memory system for providing a slow command decode over an untrained high-speed interface. The memory system includes a memory system having a memory interface device, an untrained high-speed interface, and a memory controller. The untrained high-speed interface is in communication with the memory interface device. The memory controller generates slow commands and transmits the slow commands to the memory interface device via the untrained high-speed interface. The slow commands operate at a first data rate that is slower than a second data rate utilized by the high-speed interface after it has been trained. The memory interface device receives the slow commands via the untrained high-speed interface, decodes the slow commands, and executes the slow commands.

20 Claims, 20 Drawing Sheets

| DOWNSTREAM | | | | | | FORMAT: 9 DATA + 8 CMD + 4 ECC + 1 SPARE + 1 DIFF CLK = 24 WIRES | | | | | | | | | | | | | | | | |
|---|---|---|---|---|---|---|---|---|---|---|---|---|---|---|---|---|---|---|---|---|---|---|
| s3_us(#) d3_s3(#) | 0 | 1 | 2 | 3 | 4 | 5 | 6 | 7 | 8 | 9 | 10 | 11 | 12 | 13 | 14 | 15 | 16 | 17 | 18 | 19 | 20 | 21 |
| Xfer/Bit | SPARE | ECC0 | ECC1 | ECC2 | ECC3 | DI0 | DI1 | DI2 | DI3 | DI4 | DI5 | DI6 | DI7 | DI8 | C0 | C1 | C2 | C3 | C4 | C5 | C6 | C7 |
| 0 | S0 | E00 | E10 | E20 | E30 | D00 | D10 | D20 | D30 | D40 | D50 | D60 | D70 | D80 | C00 | C10 | C20 | C30 | C40 | C50 | C60 | C70 |
| 1 | S1 | E01 | E11 | E21 | E31 | D01 | D11 | D21 | D31 | D41 | D51 | D61 | D71 | D81 | C01 | C11 | C21 | C31 | C41 | C51 | C61 | C71 |
| 2 | S2 | E02 | E12 | E22 | E32 | D02 | D12 | D22 | D32 | D42 | D52 | D62 | D72 | D82 | C02 | C12 | C22 | C32 | C42 | C52 | C62 | C72 |
| 3 | S3 | E03 | E13 | E23 | E33 | D03 | D13 | D23 | D33 | D43 | D53 | D63 | D73 | D83 | C03 | C13 | C23 | C33 | C43 | C53 | C63 | C73 |
| 4 | S4 | E04 | E14 | E24 | E34 | D04 | D14 | D24 | D34 | D44 | D54 | D64 | D74 | D84 | C04 | C14 | C24 | C34 | C44 | C54 | C64 | C74 |
| 5 | S5 | E05 | E15 | E25 | E35 | D05 | D15 | D25 | D35 | D45 | D55 | D65 | D75 | D85 | C05 | C15 | C25 | C35 | C45 | C55 | C65 | C75 |
| 6 | S6 | E06 | E16 | E26 | E36 | D06 | D16 | D26 | D36 | D46 | D56 | D66 | D76 | D86 | C06 | C16 | C26 | C36 | C46 | C56 | C66 | C76 |
| 7 | S7 | E07 | E17 | E27 | E37 | D07 | D17 | D27 | D37 | D47 | D57 | D67 | D77 | D87 | C07 | C17 | C27 | C37 | C47 | C57 | C67 | C77 |

SPARE BITS 1002

E: ECC CHECK BITS 1004

D: WRITE DATA BITS 1006

C: COMMAND BITS 1008

FIG. 10A

| UPSTREAM | | | | | | | | | | | | | | | FORMAT: 18 DATA + 4 ECC + 1 SPARE + 1 DIFF CLK = 25 TOTAL WIRES | | | | | | | |
|---|---|---|---|---|---|---|---|---|---|---|---|---|---|---|---|---|---|---|---|---|---|---|
| s3_us(#)<br>ds_s3(#) | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
| Xfer/Bit | spare | ecc0 | ecc1 | ecc2 | ecc3 | do0 | do1 | do2 | do3 | do4 | do5 | do6 | do7 | do8 | do9 | do10 | do11 | do12 | do13 | do14 | do15 | do16 | do17 |
| 0 | S0 | E00 | E10 | E20 | E30 | D00 | D10 | D20 | D30 | D40 | D50 | D60 | D70 | D80 | D90 | D100 | D110 | D120 | D130 | D140 | D150 | D160 | D170 |
| 1 | S1 | E01 | E11 | E21 | E31 | D01 | D11 | D21 | D31 | D41 | D51 | D61 | D71 | D81 | D91 | D101 | D111 | D121 | D131 | D141 | D151 | D161 | D171 |
| 2 | S2 | E02 | E12 | E22 | E32 | D02 | D12 | D22 | D32 | D42 | D52 | D62 | D72 | D82 | D92 | D102 | D112 | D122 | D132 | D142 | D152 | D162 | D172 |
| 3 | S3 | E03 | E13 | E23 | E33 | D03 | D13 | D23 | D33 | D43 | D53 | D63 | D73 | D83 | D93 | D103 | D113 | D123 | D133 | D143 | D153 | D163 | D173 |
| 4 | S4 | E04 | E14 | E24 | E34 | D04 | D14 | D24 | D34 | D44 | D54 | D64 | D74 | D84 | D94 | D104 | D114 | D124 | D134 | D144 | D154 | D164 | D174 |
| 5 | S5 | E05 | E15 | E25 | E35 | D05 | D15 | D25 | D35 | D45 | D55 | D65 | D75 | D85 | D95 | D105 | D115 | D125 | D135 | D145 | D155 | D165 | D175 |
| 6 | S6 | E06 | E16 | E26 | E36 | D06 | D16 | D26 | D36 | D46 | D56 | D66 | D76 | D86 | D96 | D106 | D116 | D126 | D136 | D146 | D156 | D166 | D176 |
| 7 | S7 | E07 | E17 | E27 | E37 | D07 | D17 | D27 | D37 | D47 | D57 | D67 | D77 | D87 | D97 | D107 | D117 | D127 | D137 | D147 | D157 | D167 | D177 |

SPARE BITS 1010

E: ECC CHECK BITS 1012

READ DATA BITS 1014

FIG. 10B

| Xfer 0 Bits (0:2) | | Primary Command Decodes | Type |
|---|---|---|---|
| Slow Commands | Bits (3:4) | | |
| '001' | '00' | Read Slow Data Buffer | slow |
| '001' | '01' | Write Slow Address/Data Buffer | slow |
| '001' | '10' | Read SCOM Register to Slow Data Buffer | slow |
| '001' | '11' | Write SCOM Register to Slow Data Buffer | slow |
| No Operation | | | |
| '000' | | Idle | 0:2 / 4:6 / 0:7 |

FIG. 13

Write Slow Address/Data Buffer

| Bits | Xfer 0-7 | Xfer 0-7 | Xfer 0-7 |
|---|---|---|---|
| C0 | '000'<br>Idle | '001'<br>Slow Command | '000'<br>Idle |
| C1 | | | |
| C2 | | | |
| C3 | '01'<br>Write Slow Data Buffer | '01'<br>Write Slow Data Buffer | '01'<br>Write Slow Data Buffer |
| C4 | | | |
| C5 | Slow Data Buffer Pointer<br>(0:2) | Slow Data Buffer Pointer<br>(0:2) | Slow Data Buffer Pointer<br>(0:2) |
| C6 | | | |
| C7 | | | |
| D0 | -Data/Address | -Data/Address | -Data/Address |
| D1 | Buffer Data (0:7) | Buffer Data (0:7) | Buffer Data (0:7) |
| D2 | | | |
| D3 | | | |
| D4 | | | |
| D5 | | | |
| D6 | | | |
| D7 | | | |
| D8 | | | |

FIG. 14

Read SCOM Register to Slow Data Buffer

| Bits | Xfer 0-7 | Xfer 0-7 | Xfer 0-7 |
|---|---|---|---|
| C0 | '000' | '001' | '000' |
| C1 | Idle | Slow Command | Idle |
| C2 | | | |
| C3 | '10' | '10' | '10' |
| C4 | Read SCOM Register to Slow Data Buffer | Read SCOM Register to Slow Data Buffer | Read SCOM Register to Slow Data Buffer |
| C5 | DIMM Select(0:2) | DIMM Select(0:2) | DIMM Select(0:2) |
| C6 | | | |
| C7 | | | |

FIG. 15

Read Slow Data Buffer

| Bits | Xfer 0-7 | Xfer 0-7 | Xfer 0-7 |
|---|---|---|---|
| C0 | '000' | '001' | '000' |
| C1 | Idle | Slow Command | Idle |
| C2 | | | |
| C3 | '00' | '00' | '00' |
| C4 | Read Slow Data Buffer | Read Slow Data Buffer | Read Slow Data Buffer |
| C5 | DIMM | DIMM | DIMM |
| C6 | Select (0:2) | Select (0:2) | Select (0:2) |
| C7 | | | |
| D0 | '0' | '0' | '0' |
| D1 | '0' | '0' | '0' |
| D2 | '0' | '0' | '0' |
| D3 | '0' | '0' | '0' |
| D4 | '0' | '0' | '0' |
| D5 | '0' | '0' | '0' |
| D6 | '0' | '0' | '0' |
| D7 | SDBP(0:1) | SDBP(0:1) | SDBP(0:1) |
| D8 | | | |

FIG. 16A

| wd (7:8) | rd (0:15) |
|---|---|
| "00" | sdb(0:15) |
| "01" | sdb(16:31) |
| "10" | sdb(32:47) |
| "11" | sdb(48:63) |

FIG. 16B

Write SCOM Register From Slow Data Buffer

| Bits | Xfer 0-7 | Xfer 0-7 | Xfer 0-7 |
|---|---|---|---|
| C0<br>C1<br>C2 | '000'<br>Idle | '001'<br>Slow Command | '000'<br>Idle |
| C3<br>C4 | '11'<br>Write SCOM Register from Slow Data Buffer | '11'<br>Write SCOM Register from Slow Data Buffer | '11'<br>Write SCOM Register from Slow Data Buffer |
| C5<br>C6<br>C7 | DIMM<br>Select (0:2) | DIMM<br>Select (0:2) | DIMM<br>Select (0:2) |

FIG. 17

SYSTEM FOR PROVIDING A SLOW COMMAND DECODE OVER AN UNTRAINED HIGH-SPEED INTERFACE

BACKGROUND OF THE INVENTION

This invention relates generally to computer memory, and more particularly to a memory system comprising one or more high speed interfaces which require training and/or calibration prior to normal operation.

Contemporary high performance computing main memory systems are generally composed of one or more dynamic random access memory (DRAM) devices, which are connected to one or more processors via one or more memory control elements. Overall computer system performance is affected by each of the key elements of the computer structure, including the performance/structure of the processor(s), any memory cache(s), the input/output (I/O) subsystem(s), the efficiency of the memory control function(s), the main memory device(s), and the type and structure of the memory interconnect interface(s).

Extensive research and development efforts are invested by the industry, on an ongoing basis, to create improved and/or innovative solutions to maximizing overall system performance and density by improving the memory system/subsystem design and/or structure. High-availability systems present further challenges as related to overall system reliability due to customer expectations that new computer systems will markedly surpass existing systems in regard to mean-time-between-failure (MTBF), in addition to offering additional functions, increased performance, increased storage, lower operating costs, etc. Other frequent customer requirements further exacerbate the memory system design challenges, and include such items as ease of upgrade and reduced system environmental impact (such as space, power and cooling).

FIG. 1 relates to U.S. Pat. No. 5,513,135 to Dell et al., of common assignment herewith, and depicts an early synchronous memory module. The memory module depicted in FIG. 1 is a dual in-line memory module (DIMM). This module is composed of synchronous DRAMs 8, buffer devices 12, an optimized pinout, and an interconnect and capacitive decoupling method to facilitate high performance operation. The patent also describes the use of clock re-drive on the module, using such devices as phase-locked loops (PLLs).

FIG. 2 relates to U.S. Pat. No. 6,173,382 to Dell et al., of common assignment herewith, and depicts a computer system 210 which includes a synchronous memory module 220 that is directly (i.e. point-to-point) connected to a memory controller 214 via a bus 240, and which further includes logic circuitry 224 (such as an application specific integrated circuit, or "ASIC") that buffers, registers or otherwise acts on the address, data and control information that is received from the memory controller 214. The memory module 220 can be programmed to operate in a plurality of selectable or programmable modes by way of an independent bus, such as an inter-integrated circuit (I2C) control bus 234, either as part of the memory initialization process or during normal operation. When utilized in applications requiring more than a single memory module connected directly to a memory controller, the patent notes that the resulting stubs can be minimized through the use of field-effect transistor (FET) switches to electrically disconnect modules from the bus.

Relative to U.S. Pat. Nos. 5,513,135, 6,173,382 further demonstrates the capability of integrating all of the defined functions (address, command, data, presence detect, etc) into a single device. The integration of functions is a common industry practice that is enabled by technology improvements and, in this case, enables additional module density and/or functionality.

FIG. 3, from U.S. Pat. No. 6,510,100 to Grundon et al., of common assignment herewith, depicts a simplified diagram and description of a memory system 310 that includes up to four registered DIMMs 340 on a traditional multi-drop stub bus. The subsystem includes a memory controller 320, an external clock buffer 330, registered DIMMs 340, an address bus 350, a control bus 360 and a data bus 370 with terminators 395 on the address bus 350 and the data bus 370. Although only a single memory channel is shown in FIG. 3, systems produced with these modules often included more than one discrete memory channel from the memory controller, with each of the memory channels operated singly (when a single channel was populated with modules) or in parallel (when two or more channels where populated with modules) to achieve the desired system functionality and/or performance.

FIG. 4, from U.S. Pat. No. 6,587,912 to Bonella et al., depicts a synchronous memory module 410 and system structure in which the repeater hubs 420 include local re-drive of the address, command and data to the local memory devices 401 and 402 via buses 421 and 422; generation of a local clock (as described in other figures and the patent text); and the re-driving of the appropriate memory interface signals to the next module or component in the system via bus 400.

FIG. 5 depicts a contemporary system composed of an integrated processor chip 500, which contains one or more processor elements and an integrated memory controller 510. In the configuration depicted in FIG. 5, multiple independent cascade interconnected memory interface busses 506 are logically aggregated together to operate in unison to support a single independent access request at a higher bandwidth with data and error detection/correction information distributed or "striped" across the parallel busses and associated devices. The memory controller 510 attaches to four narrow/high speed point-to-point memory busses 506, with each bus 506 connecting one of the several unique memory controller interface channels to a cascade interconnect memory subsystem 503 (or memory module) which includes at least a hub device 504 and one or more memory devices 509. Some systems further enable operations when a subset of the memory busses 506 are populated with memory subsystems 503. In this case, the one or more populated memory busses 508 may operate in unison to support a single access request.

FIG. 6 depicts a memory structure with cascaded memory modules 503 and unidirectional busses 506. One of the functions provided by the hub devices 504 in the memory modules 503 in the cascade structure is a re-drive function to send signals on the unidirectional busses 506 to other memory modules 503 or to the memory controller 510. FIG. 6 includes the memory controller 510 and four memory modules 503, on each of two memory busses 506 (a downstream memory bus with 24 wires and an upstream memory bus with 25 wires), connected to the memory controller 510 in either a direct or cascaded manner. The memory module 503 next to the memory controller 510 is connected to the memory controller 510 in a direct manner. The other memory modules 503 are connected to the memory controller 510 in a cascaded manner. Although not shown in this figure, the memory controller 510 may be integrated in the processor 500 and may connect to more than one memory bus 506 as depicted in FIG. 5.

Typically, the high-speed memory bus requires training before it can be used in a high-speed production environment. The high-speed memory bus training may include transmitting a series of commands, via a service interface port, to perform bus calibration and alignment. Further adjustments to the bus timing are often applied during normal system operation, via periodic re-calibration, to ensure continued proper bus operation (e.g. the ability of a sending and receiving device to communicate, thereby ensuring consistent and reliable recovery of transmitted information). FIG. 7 is a block diagram of a memory system that uses an external Joint Test Action Group (JTAG) or FSI master 704 and slow speed interfaces 710 to access a JTAG/FSI port 714 on buffer 706 to perform functions such as power-on reset, device pre-conditioning, logic and interface testing and high speed link interface training. The memory system depicted in FIG. 7 includes a memory controller 702 (master) that is connected to a memory hub device 706 (slave) via one or more high-speed interfaces 708 which require training prior to conventional operation. In the memory system depicted in FIG. 7, a separate slow speed service link including the JTAG or FSI interface 710, the JTAG or FSI memory controller 704 and the JTAG/FSI port 714 is used to configure internal registers (e.g., to train the high-speed interface 708) on the one or more memory hub devices 706 such that the one or more high speed interface 708 can be utilized for communication between the memory controller 702 and the memory hub device 714 during normal system operation.

It would be desirable to be able to send commands and data over the untrained high-speed interfaces in a memory system in order to eliminate (or provide a back-up for) the extra hardware and interfaces required by separate JTAG or FSI interfaces and controllers.

BRIEF SUMMARY OF THE INVENTION

An exemplary embodiment includes a memory system having a memory interface device, an untrained high-speed interface, and a memory controller. The untrained high-speed interface is in communication with the memory interface device. The memory controller generates slow commands and transmits the slow commands to the memory interface device via the untrained high-speed interface. The slow commands operate at a first data rate that is significantly slower than a second data rate utilized by the high-speed interface after it has been trained. The memory interface device receives the slow commands via the untrained high-speed interface, decodes the slow commands, and executes the slow commands.

Another exemplary embodiment includes a hub device in a memory system. The hub device includes a connection to a high-speed interface and includes slow command decode circuitry. The slow command circuitry includes logic for receiving slow commands over the high-speed interface. The slow commands operate at a first data rate that is slower than a second data rate utilized by the high-speed interface after it has been trained. The slow command circuitry also includes logic for decoding and executing the slow commands.

A further exemplary embodiment includes a memory module having a plurality of memory devices and a memory interface device. The memory interface device is in communication with the memory devices via a first interface and in communication with a memory controller via an untrained high-speed interface. The memory interface device includes circuitry for: receiving slow commands over the untrained high-speed interface when the high-speed interface; decoding the slow commands; and executing the slow commands. The slow commands operate at a first data rate that is slower than a second data rate utilized by the high-speed interface after it has been trained.

BRIEF DESCRIPTION OF THE DRAWINGS

Referring now to the drawings wherein like elements are numbered alike in the several FIGURES:

FIGS. 10A and 10B depict exemplary downstream (FIG. 10A) and upstream (FIG. 10B) frame formats that may be implemented by an exemplary embodiment, upon completion of training of the high speed downstream and upstream busses;

FIG. 13 is a table of exemplary slow commands that may be implemented by an exemplary embodiment;

FIG. 14 depicts downstream frames that may be utilized by an exemplary "Write Slow Address/Data Buffer slow command operation;

FIG. 15 depicts downstream frames that may be utilized by an exemplary "Read SCOM Register to Slow Data Buffer" slow command operation;

FIGS. 16A and 16B depict downstream frames that may be utilized by an exemplary "Read Slow Data Buffer" slow command operation;

FIG. 17 depicts downstream frames that may be utilized by an exemplary "Write SCOM Register from Slow Data Buffer" slow command operation;

DETAILED DESCRIPTION OF EXEMPLARY EMBODIMENTS

An exemplary embodiment provides an innovative slow command decode solution that allows use of high speed interface(s) prior to training (e.g., calibration and alignment) of the high speed interfaces. This eliminates the need for a separate JTAG/FSI interface to configure internal registers prior to training of the high speed interface(s), thus simplifying the master (e.g., controller)/slave (e.g., hub device) interface. Beyond setting configuration bits to run alignment procedures, exemplary embodiments may also be used for one or more of setting and/or reading register settings on the hub device, communicating with upstream and/or downstream hub devices, communicating with local memory devices, etc. As used herein the term "untrained high speed interface" refers to one or more busses which normally operate over a given frequency range, but are incapable of sending and/or receiving information in an understandable manner at otherwise normal speeds until one or more of drive strength, receiver capture timings and bus terminations are properly calibrated for the then current environmental conditions. In an exemplary embodiment, the "untrained high speed interface" operates at a speed in the range of 5 percent of the normal operating speed of a "trained" high speed bus, thereby negating the need of an alternate bus to pre-condition the interface prior to normal "high speed" operation.

Figure 8:
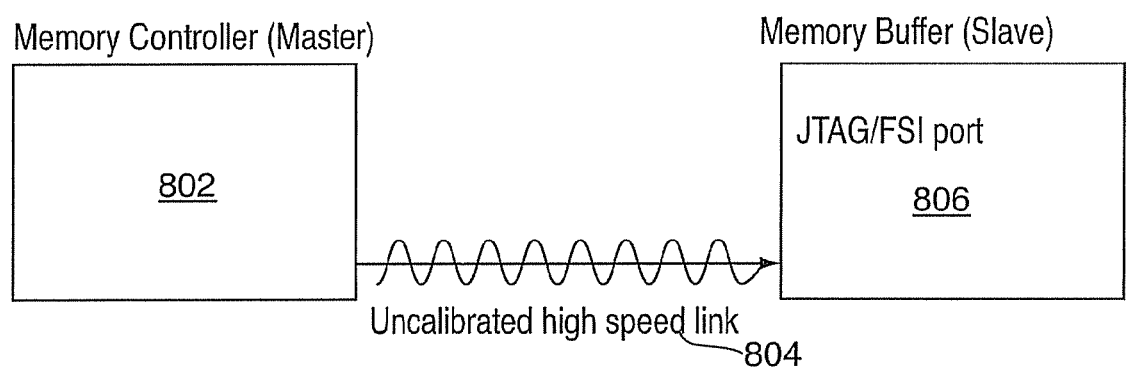
FIG. 8 is a high level block diagram of a memory system that may be implemented by an exemplary embodiment.

FIG. 8 depicts a high level block diagram of an exemplary memory system that may be implemented by an exemplary embodiment of the present invention. The exemplary memory system includes a memory controller 802 (master), connected to a memory buffer or hub device 806 (slave) via one or more high-speed interfaces 804 which require training (e.g. the execution of an interface alignment procedure (IAP)) prior to conventional operation. In the memory system depicted in FIG. 8, a separate service interface and port(s) is not utilized for the configuration of internal registers on the one or more buffer (slave) devices, although this interface may exist. Although not shown, exemplary embodiments may include a cascade interconnect port on memory buffer 806, permitting connection to another downstream buffer 806. In FIG. 8, the IAP operation is initiated through the use of slow command decodes which are sent from the memory controller 802 to the memory hub device 806 on the one or more un-calibrated high speed interface(s) 804 (also referred to herein as busses and/or links).

An exemplary embodiment includes a slow command decode circuit to enable the use of interface(s) which require training/calibration prior to conventional operation. Thus, the interfaces are operable, albeit at a much slower data rate, prior to completing an interface alignment procedure for such operations as the configuration of internal registers through the use of an exemplary slow command decode. In an exemplary embodiment, the slow command decode circuit shares common elements with JTAG/FSI circuitry located in the hub device which may be used in applications where either a JTAG or FSI interface (or other interface suited for this purpose) exists.

Another exemplary embodiment includes a slow command and data structure which is used in conjunction with the exemplary slow command decode circuitry. The data structure is comprised of idle, read, and write commands, address and data fields that are operable prior to the completion of an interface alignment procedure on an interface that requires interface alignment prior to normal speed operation.

A further embodiment includes a buffer or hub device, used in conjunction with one or more memory devices (either directly connected to the device, residing on a common assembly, or residing on a separate assembly), with the buffer device and memory device(s) comprising a memory subsystem. The buffer connects to a memory controller either directly or via one or more other buffer devices, via one or more interface(s) which may also require training/calibration prior to conventional operation. The interfaces are operable prior to running an interface alignment procedure for operations such as the configuration of internal registers through the use of an exemplary slow command decode.

A further embodiment includes a computer system made up of at least a memory controller, a memory subsystem and one or more interfaces which require training/calibration prior to conventional operation. The interfaces are operable prior to running an interface alignment procedure for operations such as the configuration of internal registers through the use of an exemplary slow command decode.

Figure 9:
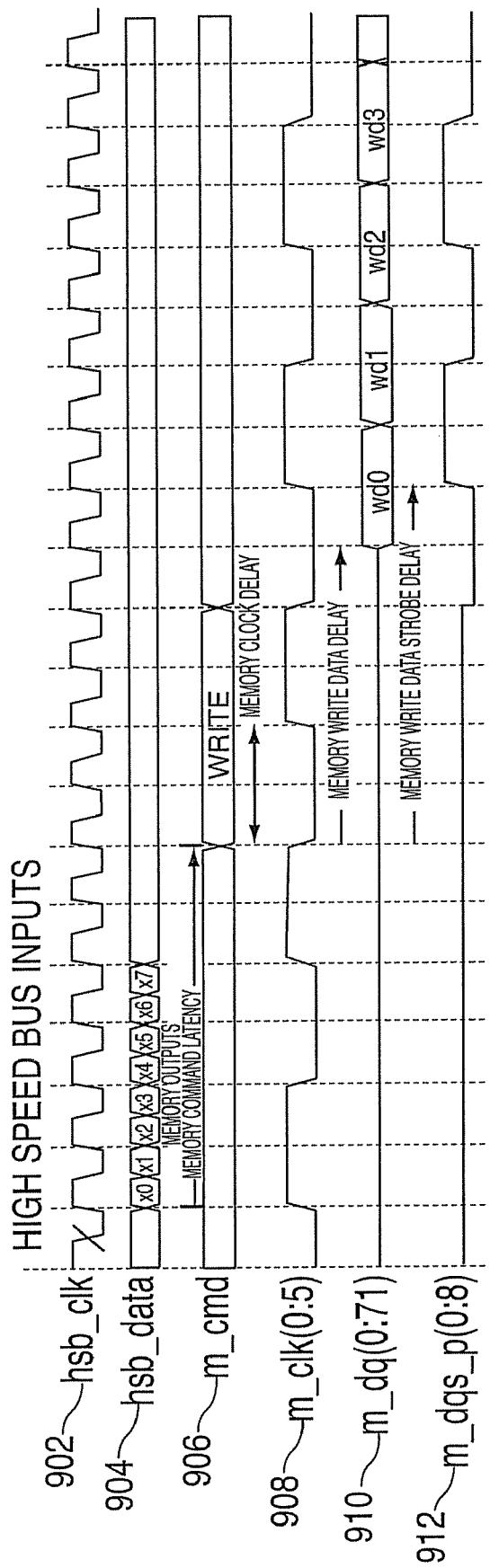
FIG. 9 depicts bus and SDRAM timing diagrams that may be implemented by an exemplary embodiment, upon completion of training of the high speed (downstream) bus.

FIG. 9 depicts bus and SDRAM timing diagrams showing the four to one bus speed multiplier that may be utilized by an exemplary memory system after the high-speed interface (e.g., bus or link) has been trained. FIG. 9 is a simplified "write" timing diagram that demonstrates the bus timing relationships for a write cycle. The same approach may be taken for other cycles, such as a read cycle. The high-speed bus clock (hsb_clk) 902 is the notation for the differential clock that travels with the high speed data traveling downstream from a memory controller to the first memory module, or DIMM. Even though the hsb_clk 902 is shown as being single-ended, in exemplary embodiments of the present invention, a differential clock is utilized to reduce clock sensitivity to external noise and coupling. The high-speed data signal (hsb_data) 904 shows a burst of eight transfers, operating at a double data rate speed (i.e., data is valid on both edges of the clock), which in this example constitutes a single frame of address, command and data to the first memory module position. With the aforementioned downstream bus width of twenty-two bits, and the burst of eight, a full frame can constitute up to one hundred and seventy-six unique bits, depending on the assignment or use of these bits and the actual wires on the bus. Thus, the data is packetized with each packet, or frame, containing the contents of multiple transfers (e.g., eight bursts).

Also as shown in FIG. 9, the eight bursts occur over four of the hsb_clk cycle times, at which point this example shows no further activity on the high speed bus. The local memory clock (m_clk) 908 on the memory module is derived from the hsb_clk 902, and is shown as a single-ended signal m_clk (0:5) operating at one quarter the frequency of the hsb_clk 902. Although shown as a single-ended clock, in an exemplary embodiment of the present invention, the m_clk 908 would also operate as a differential clock. The decoded memory command signifying a 'write' operation to the memory devices (e.g., double data rate (DDR2) memory devices, or SDRAMS) on the memory module is shown on the signal labeled m_cmd 906. This command is decoded from the high-speed bus and is driven by the hub device to the memory devices to ensure arrival at the memory devices prior to the rising edge of the clock at the memory devices. The seventy-two bits of data written to the memory devices is shown as m_dq(0:71) 910, and is shown arriving at the memory devices one full memory clock after the write command is decoded, as a DDR signal relative to the m_clk 908. In an exemplary embodiment of the present invention, the data, or m_dq(0:71) 910 is single ended. The nine DDR data strobes (m_dqs_p) 912 are also shown, as single ended signals, switching one quarter of a clock cycle prior to the data bus for the memory devices, thereby ensuring that the strobe switches approximately in the center of each valid write data bit. In an exemplary embodiment of the present invention, the m_dqs_p 912 is differential. This diagram demonstrates a burst of four data bits to the memory devices (wd0 through wd3), with seventy-two bits of memory data being provided to the memory devices every memory clock cycle. In this manner, the data rate of the slower memory modules is matched to the high-speed memory bus that operates at four times the speed of the memory modules. In this manner, the packetized multi-transfer interface of the high-speed memory bus is converted into a parallel interface for a lower speed bus utilized by the memory devices.

FIG. 10A depicts an exemplary downstream frame format (or packet format) that may be utilized by a memory system to transfer information downstream from a memory controller to one or more memory modules in a packetized manner via the high-speed interface. The downstream frame consists of eight transfers, with each transfer including twenty-two signals and a differential clock (twenty-four wires total). The frame includes eight command wires (c0 through c7) 1008, nine data wires (di0 through di8) 1006, four bus ECC (Error Correcting Code) wires (ecc0 through ecc3) 1004 and a spare wire (spare) 1002. The seventy-two data bits referenced in the timing diagram of FIG. 9 are shown in FIG. 10A as bits di0 through di8 include nine wires with eight transfers on each wire for each frame. The numbering of each data bit, as well as for other bits, is based on the wire used as well as the specific transfer. D34 refers to data bit 3 (of bits 0 through 8) and transfer 4 (of transfer 0 through 7). The command bit field is shown as c0 through c7, and consists of sixty-four bits of information provided to the module over eight transfers. The ECC bit field (ecc0 through ecc3) consists of thirty-two bit positions over eight transfers, but is actually formatted in groups of sixteen bits. Each sixteen bit packet consists of four transfers over each of the four wires, and provide the bus level fault detection and correction across each group of 4 bus transfers. The spare bit position may be used to logically replace any of the twenty-one wires, also defined as bitlanes, used to transfer bits in the command, data and ECC fields, should a failure occur in one of those bitlanes that results in errors that exceed a system-assigned failure threshold limit. Using this exemplary embodiment of the present invention, provides that out of the one hundred and seventy-six possible bit positions, one hundred and sixty-eight are available for the transfer of information to the memory module, and of those one hundred and sixty-eight bit positions, thirty-two bit positions are further assigned to providing ECC protection on the bus transfers themselves, thereby allowing a total of one hundred and thirty-six bit positions to be used for the transfer of information to the memory module. The frame format depicted in FIG. 10A is meant to be an example, as other frame formats may also be utilized depending, for example, on the type of information being transferred. In addition, one or both of the command and data signals (or bits) may contain address signals (or bits).

FIG. 10B depicts an exemplary upstream frame format (or packet format) that may be utilized by a memory system to transfer information upstream from a memory module to another upstream memory module and/or the memory controller in a packetized manner. The upstream frame consists of eight transfers, with each transfer including twenty-three signals and a differential clock (twenty-five wires total). The frame includes eighteen data wires (do0 through do17) 1014, four bus ECC wires (ecc0 through ecc3) 1012 and a spare wire (spare) 1010. The data bit field is shown as do0 through do17, and consists of 18 wires with eight transfers on each wire for each frame. The numbering of each data bit, as well as for other bits, is based on the wire used as well as the specific transfer. D84 refers to data bit 8 (of bits 0 through 17) and transfer 4 (of transfer 0 through 7). The ECC bit field (ecc0 through ecc3) consists of thirty-two bit positions over eight transfers, but is actually formatted in groups of sixteen bits. Each sixteen bit packet consists of four transfers over each of the four wires, and provides the bus level fault detection and correction across each group of 4 bus transfers. The spare bit position may be used to logically replace any of the twenty-two wires, also defined as bitlanes, used to transfer bits in the data and ECC fields, should a failure occur in one of those bitlanes that results in errors that exceed a system-assigned failure threshold limit. Using this exemplary embodiment of the present invention, provides that out of the one hundred and eighty-four bit positions, one hundred and seventy-six are available for the transfer of information to the memory module, and of those one hundred and seventy-six bit positions, thirty-two bit positions are further assigned to providing ECC protection on the bus transfers themselves, thereby allowing a total of one hundred and forty-four bit positions to be used for the transfer of information to the memory module. The frame format depicted in FIG. 10B is meant to be an example, as other frame formats may also be utilized depending, for example, on the type of information being transferred.

Figure 5:
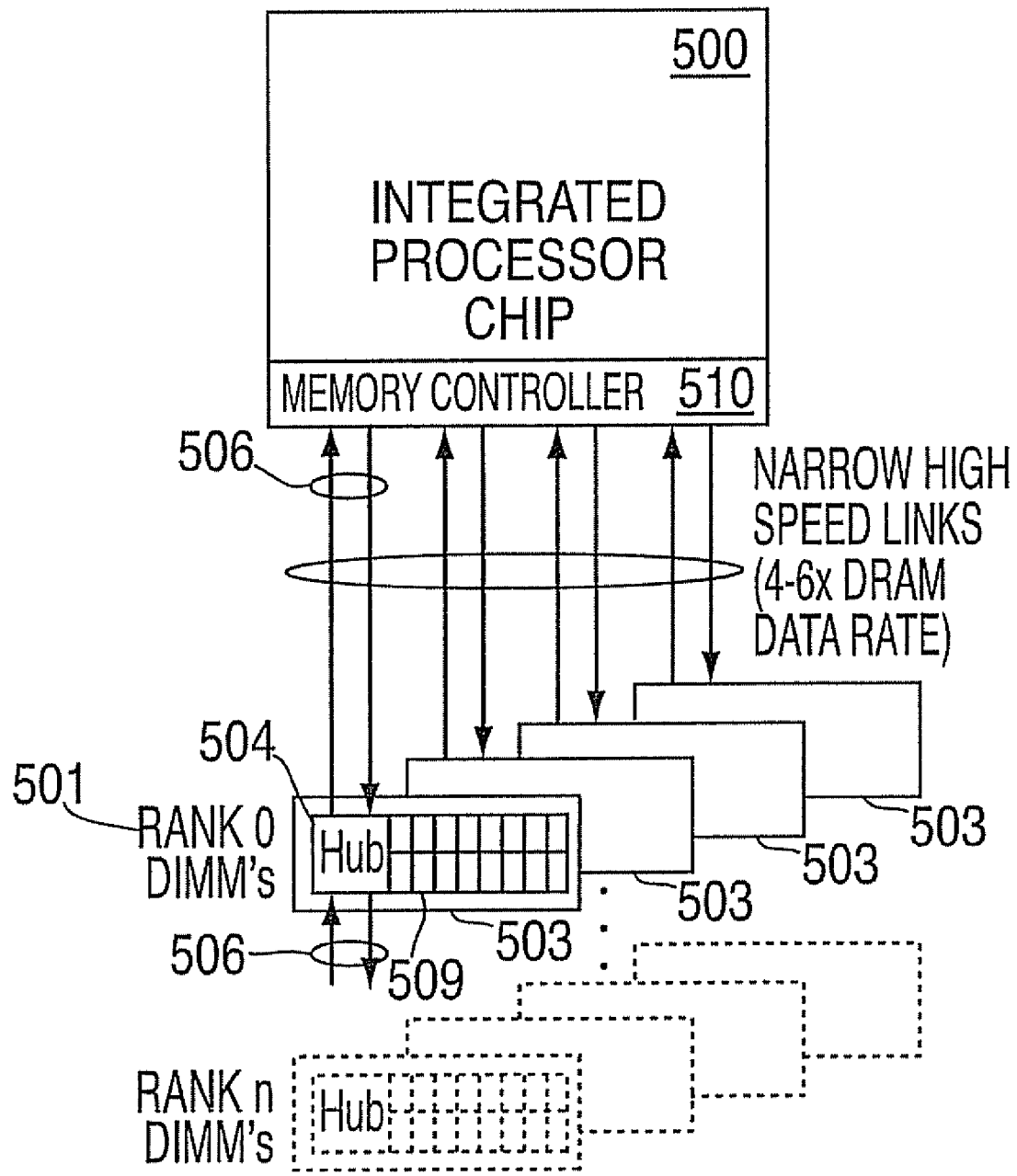
FIG. 5 depicts a cascade interconnect memory system with unidirectional busses.
Figure 6:
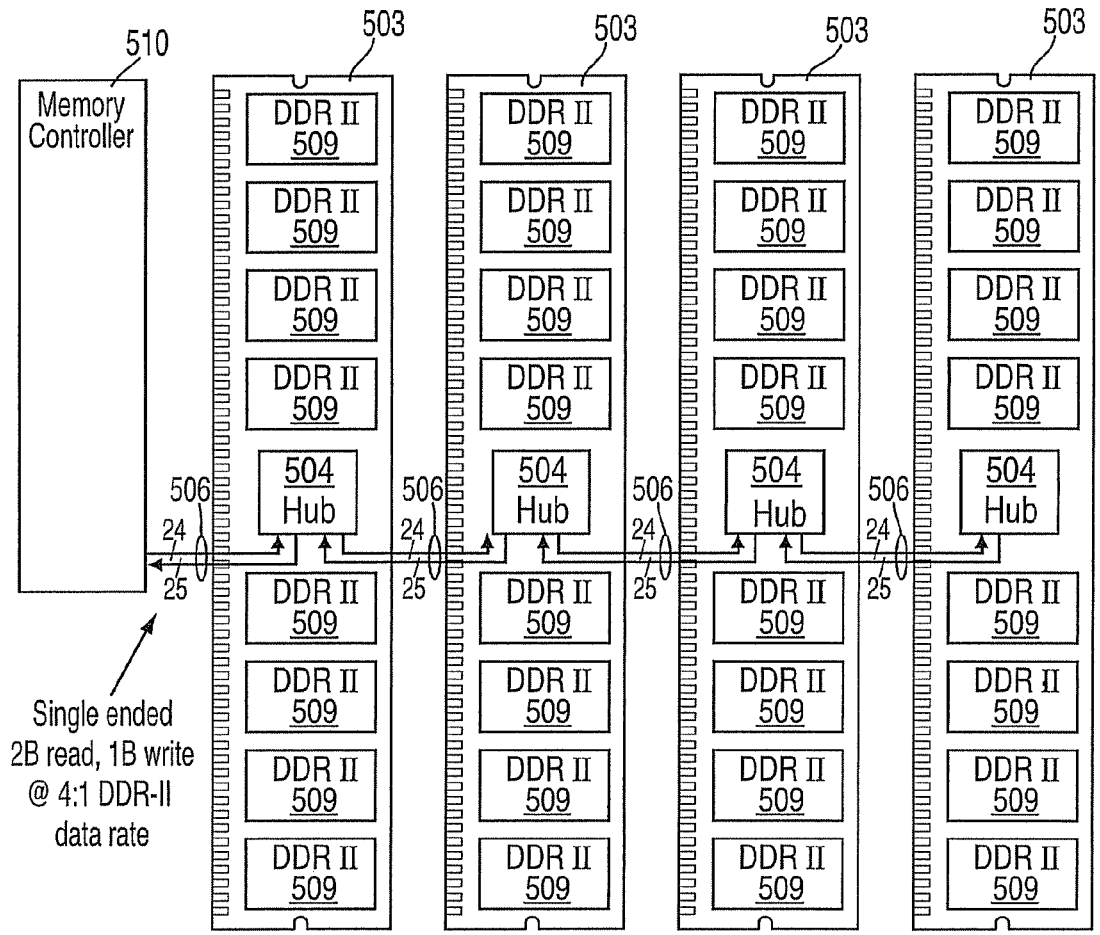
FIG. 6 depicts a cascade interconnect memory system with unidirectional busses.
Figure 7:
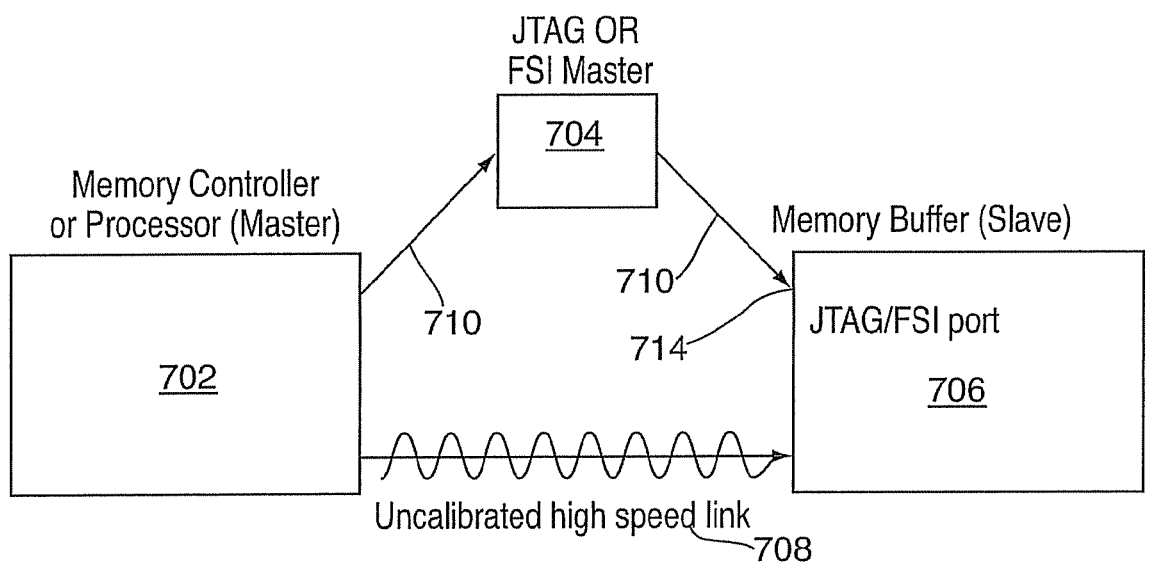
FIG. 7 depicts a memory system that utilizes an external JTAG or FSI controller to communicate service commands to a memory buffer.
Figure 11:
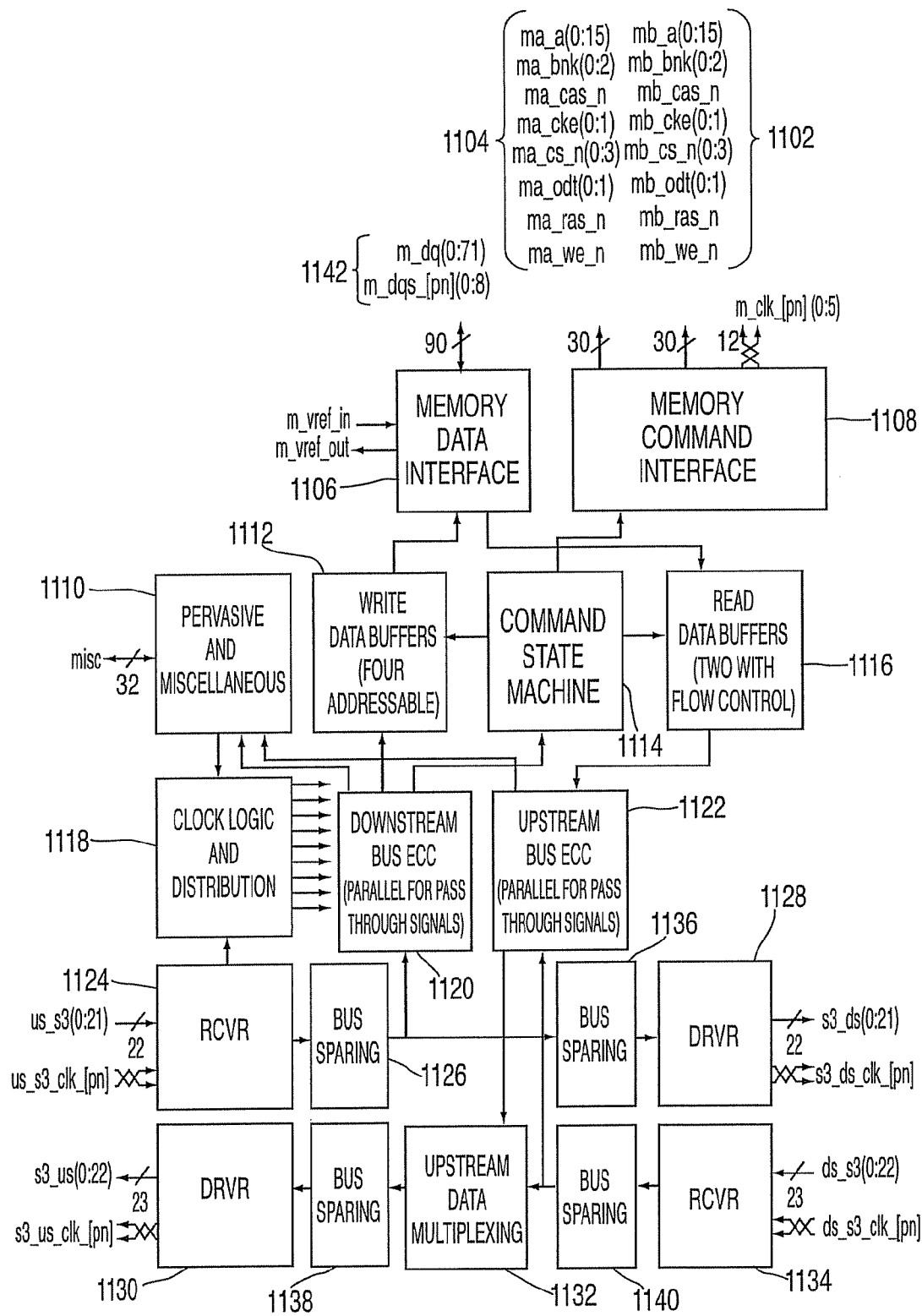
FIG. 11 is a block diagram of the high level flow of a hub device that may be implemented by an exemplary embodiment.

FIG. 11 is a block diagram of the high level flow of a hub device located on a memory module that may be implemented by exemplary embodiments. In an exemplary embodiment, the memory system containing the hub device is configured in a manner similar to the cascade interconnect memory systems depicted in FIGS. 5 and 6 with a hub device located in a memory module. The blocks in the lower left and right portions of FIG. 11 (1124, 1128, 1130, 1134) are associated with receiving or driving the high-speed bus. The upstream bus passes information in the direction of the memory controller, and the downstream bus passes information away from the memory controller.

Referring to FIG. 11, data, command, address, ECC, and clock signals from an upstream memory assembly (e.g., a memory module 503) or the memory controller are received from the downstream memory bus into a receiver functional block 1124. The receiver functional block 1124 provides macros and support logic for the downstream memory bus and, in an exemplary embodiment of the present invention includes support for a twenty-two bit, high speed, slave receiver bus. The receiver functional block 1124 transmits the clock signals to a clock logic and distribution functional block 1118 (e.g., to generate the four to one clock signals). The clock logic and distribution functional block 1118 also receives data input from the pervasive and miscellaneous functional block 1110. These signals typically include control and setup information for the clock distribution PLL's, test inputs for BIST (built-in self-test) modes, programmable timing settings, etc. The receiver functional block 1124 transfers the data, command, ECC and address signals to a bus sparing logic block 1126 to reposition, when applicable, the bit placement of the data in the event that a spare wire is utilized during the transmission from the previous memory module.

The bus sparing logic block 1126 may be implemented by a multiplexer to shift the signal positions, if needed. Next, the original or re-ordered signals are input to another bus sparing logic block 1136 to modify, or reorder if necessary, the signal placement to account for any defective interconnect that may exist between the current memory module and a downstream memory module. The original or re-ordered signals are then input to a driver functional block 1128 for transmission, via the downstream memory bus, to the next memory module in the chain. The bus sparing logic 1136 may be implemented using a multiplexer. The driver functional block 1128 provides macros and support logic for the downstream memory bus and the twenty-two bit, high-speed, low-latency cascade bus drivers.

In addition to inputting the original or re-ordered signals to the bus sparing logic block 1136, the bus sparing logic block 1126 also inputs the original or re-ordered signals into a downstream bus ECC functional block 1120 to perform error detection and correction for the frame. The downstream bus ECC functional block 1120 operates on any information received or passed through the hub device from the downstream memory bus to determine if a bus error is present. The downstream bus ECC functional block 1120 analyzes the bus signals to determine if it they are valid. Next, the downstream bus ECC functional block 1120 transfers the corrected signals to a command state machine 1114. The command state machine 1114 inputs the error flags associated with command decodes or conflicts to a pervasive and miscellaneous functional block 1110. The downstream and upstream modules also present error flags and/or error data (if any) to the pervasive and miscellaneous functional block 1110 to enable reporting of these errors to the memory controller, processor, service processor or other error management unit.

Referring to FIG. 11, the pervasive and miscellaneous functional block 1110 also transmits error flags and/or error data to the memory controller. By collecting error flags and/or error data from each memory module in the chain of memory modules, the memory controller will be able to identify the failing segment(s), without having to initiate further diagnostics, though additional diagnostics may be performed. In addition, once an installation selected threshold (e.g., one, two, ten, or twenty) for the number of failures or type of failures has been reached, the pervasive and miscellaneous functional block 1110, generally in response to inputs from the memory controller, may substitute the spare wire for the segment that is failing. In addition to direct connections from many of the functional blocks, serial communication paths (not shown for clarity) exist between registers and other logic elements within the hub device, permitting information to be scanned in or out of these circuits during IAP, self-test operations, error recovery, etc. The pervasive and miscellaneous functional block 1110 further provides control circuitry for these scan paths, to be described later, as well as connection paths that may wire to external devices (e.g. a service processor, etc).

The error detection and correction may be performed for every group of four transfers, thereby permitting operations to be decoded and initiated after half of the eight transfers (where eight transfers make up a frame) are received. The processing in the ECC functional block 1120 is performed for all signals that pass through the memory module from the downstream memory bus, regardless of whether the signals are to be processed by the particular memory module. The data bits from the corrected signals are input to the write data buffers 1112 by the downstream bus ECC functional block 1120.

The command state machine 1114 also determines if the corrected signals (including data, command and address signals) are directed to and should be processed by the memory module. If the corrected signals are directed to the memory module, then the command state machine 1114 determines what actions to take and may initiate DRAM actions, write buffer actions, read buffer actions or a combination thereof. Depending on the type of memory module (buffered, unbuffered, registered), the command state machine 1114 selects the appropriate drive characteristics, timings and timing relationships. The write data buffers 1112 transmit the data signals to a memory data interface 1106 and the command state machine 1114 transmits the associated addresses and command signals to a memory command interface 1108, consistent with the specification for the memory device and/or module type to which the hub is attached or connected (buffered, unbuffered, registered)—such as the exemplary prior generation DIMM described herein.

The memory command interface 1108 includes programmable timing circuitry to enable memory device timings to be met whether the devices are directly attached to the hub, or attached indirectly via one or more modules connected to the hub/adapter assembly as described herein and in U.S. Patent Publication Number U.S. 2006/0136618A1 to Gower et al., of common assignment herewith and incorporated herein by reference in its entirety. Unbuffered memory modules, which do not include re-drive or address, control and/or command data, will generally be operated with timings similar to those of direct-attached memory devices; however drive strengths on the memory command interface 1108 may be adjusted, as well as timing relationships between signals and/or signal groupings, based on the unbuffered module type (e.g. the memory device count). Registered memory modules generally include re-drive on one or more of address, control and command signals (shown as two sets of signals, 1102 and 1104, to enable connection to one or two independent memory busses, modules or memory ranks), thereby generally requiring a lower drive strength from the memory command interface 1108, but may require a shift in one or more of the address, control and command timings relative to data due to the re-drive delay on these one or more signals on the registered DIMM.

The memory command interface 1108, therefore, includes one or more of additional programmable drive strength, terminations, programmable timings (signal output times relative to clock) and clock relationships (signals may be sent on different clock boundaries) such that a wide range of memory device attachment methods (directly and indirectly attached to the command interface) can be supported. The memory clocks are also forwarded to the attached memory devices and/or modules via the 6 differential clock pairs (12 wires) 1150 from the memory command interface 1108.

Similarly, the memory data interface 1106 reads from and writes memory data 1142 to directly attached memory device (s) and/or to one or more memory modules. As with the memory command interface 1108, the memory data interface 1106 includes one or more of programmable drive strength, terminations, programmable timings (signal output times relative to clock) and clock relationships (signals may be sent on different clock boundaries, relative to the clocks sourced from memory command interface 1108) such that a wide range of memory device attachment methods (directly and indirectly attached to the command interface) can be supported. With the exemplary interface programmability included in the memory data interface 1106 and memory command interface 1108, the exemplary hub device offers a single device and/or package solution which can be used on a module as part of a memory subsystem, on an adapter card to connect to one or more attached memory modules, as an interface device (on a system board or card) to adapt a packetized, multi-transfer interface to an alternate parallel interface, such as a multi-drop, fly-by or other memory interface, etc.

Data signals to be transmitted to the memory controller may be temporarily stored in the read data buffers 1116 after a command, such as a read command, has been executed by the memory module, consistent with the memory device 'read' timings. The read data buffers 1116 transfer the read data into an upstream bus ECC functional block 1122. The upstream bus ECC functional block 1122 generates check bits for the signals in the read data buffers 1116. The check bits and signals from the read data buffers 1116 are input to the upstream data multiplexing functional block 1132. The upstream data multiplexing functional block 1132 merges the data on to the upstream memory bus via the bus sparing logic 1138 and the driver functional block 1130. If needed, the bus sparing logic 1138 may re-direct the signals to account for a defective segment between the current memory module and the upstream receiving module (or memory controller). The driver functional block 1130 transmits the original or re-ordered signals, via the upstream memory bus, to the next memory assembly (i.e., memory module) or memory controller in the chain. In an exemplary embodiment of the present invention, the bus sparing logic 1138 is implemented using a multiplexer to shift the signals. The driver functional block 1130 provides macros and support logic for the upstream memory bus and, in an exemplary embodiment of the present invention, includes support for a twenty-three bit, high speed, low latency cascade interconnect bus.

Data, clock and ECC signals from the upstream memory bus are also received by any upstream hub device in any upstream memory module. These signals need to be passed upstream to the next memory module or to the memory controller. Referring to FIG. 11, data, ECC and clock signals from a downstream memory assembly (i.e., a memory module) are received on the upstream memory bus into a receiver functional block 1134. The receiver functional block 1134 provides macros and support logic for the upstream memory bus and, in an exemplary embodiment of the present invention includes support for a twenty-three bit, high speed, slave receiver bus. The receiver functional block 1134 passes the data and ECC signals, through the bus sparing functional block 1140, to the upstream data multiplexing functional block 1132 and then to the bus sparing logic block 1138. The signals are transmitted to the upstream memory bus via the driver functional block 1130.

In addition to passing the data and ECC signals to the upstream data multiplexing functional block 1132, the bus sparing functional block 1140 also inputs the original or re-ordered data and ECC signals to the upstream bus ECC functional block 1122 to perform error detection and correction for the frame. The upstream bus ECC functional block 1122 operates on any information received or passed through the hub device from the upstream memory bus to determine if a bus error is present. The upstream bus ECC functional block 1122 analyzes the data and ECC signals to determine if they are valid. Next, the upstream bus ECC functional block 1122 transfers any error flags and/or error data to the pervasive and miscellaneous functional block 1110 for transmission to the memory controller, service processor or other system or test element. In addition, once a pre-defined threshold for the number or type of failures has been reached, the pervasive and miscellaneous functional block 1110, generally in response to direction of the memory controller, may substitute the spare segment for a failing segment.

Figure 12:
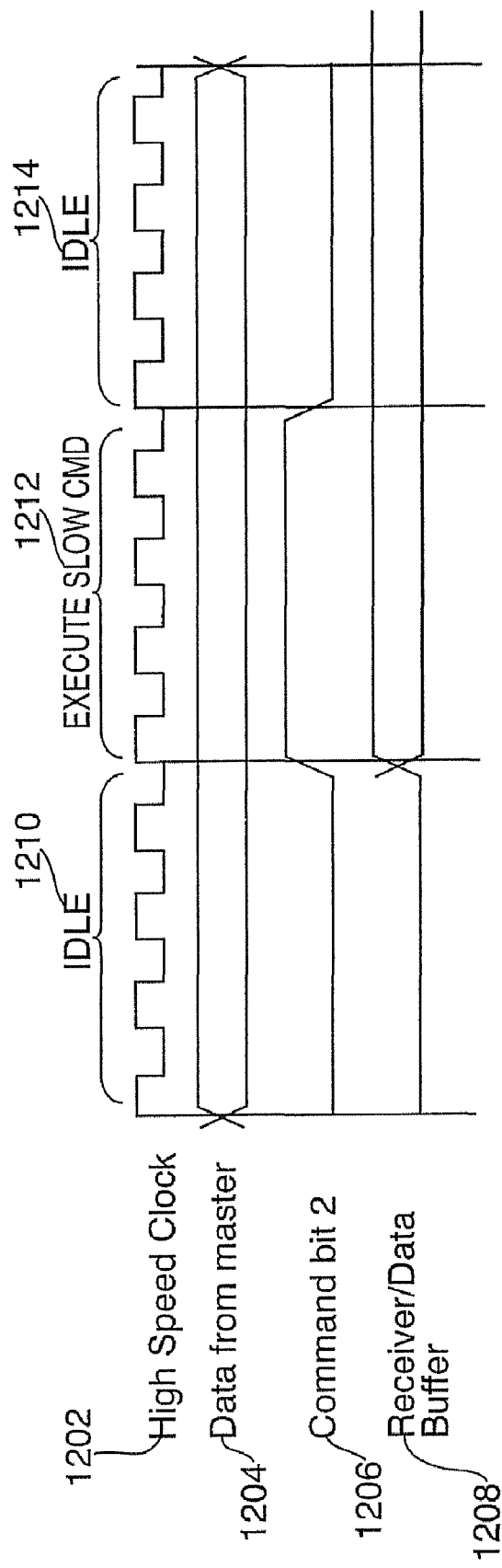
FIG. 12 depicts a simplified timing diagram of a slow command decode that may be implemented by an exemplary embodiment.

FIG. 12 depicts a simplified timing diagram example of a slow command decode, of the present invention, which is generally intended for use prior to normal, high speed bus operational capability (e.g. high speed bus training). During the slow command decode operation, the exemplary sequence identifying a "slow command" is 8 or more transfers (e.g., four clock cycles of the high speed clock 1202) in which an "IDLE" command is present on the bus 1210 (command bits 0-2 (0:2) are at a "0 0 0" state (low level)), followed by 8 transfers where command bits 0-2 (0:2) are at a "0 0 1" state 1212 (e.g., command bit 2 1206 is a high level, and command bits 0 and 1 are at a low level), followed by 8 or transfers in which an "IDLE" command is again present on the bus 1214. In an exemplary embodiment, the slave device (e.g. the hub or buffer device 1106) uses the bit change on command bit 2 (e.g. from a "0" to a "1") to capture the data from the master 1204 (e.g., from the memory controller 802). The capture of the data is depicted in FIG. 12 in the row labeled receiver/data buffer 1208. Due to the relatively slow operation of the slow commands, which change state no faster than every 8 transfers in the exemplary solution and include IDLE transfers (e.g. for 8 transfers) before and after the command itself, the system can reliably operate using untrained high speed link(s). Although the present invention utilizes 8 transfers for each IDLE and command transfer, other transfer counts can be used based on the clock speed and accuracy of the interface logic when operated in an untrained condition. In addition, other decodes other than IDLE can be used before and after the desired command, including other valid commands, also based on the system design, performance requirements, desired communication integrity, etc. The processing depicted in FIG. 12 is an example of a slow command that operates at a slower data rate than a second data rate utilized by the high-speed memory device after it has been trained. In this example, the slow command operates at a data rate that is less than 5 percent of the data rate utilized by commands on the high-speed link after the link has been trained and is fully operational since 24 transfers are utilized to transmit one "slow command" (preceded and followed by "idle" commands). Note that multiple "slow commands" will generally be required, in the exemplary embodiment, to transfer all of the information required for a given operation, so the actual bandwidth of the untrained bus is far less than 5 percent of the trained bus, however the actual bus efficiency will vary based on the application and the extent to which training is required prior to operation.

FIG. 13 depicts a table which includes "Slow Commands" that are implemented in an exemplary embodiment. The "slow commands" permit information to be written to or read from any of the one or more hub devices that reside in a memory system, thereby providing a communication means, in untrained systems, for the transfer of such information as commands, address, data, etc. Once appropriate slow address and/or data buffers/registers in one or more hubs are loaded with necessary data to commence a specified operation, such operations as configuring initial hub, memory and other register settings can be completed and IAP operations can be initiated. Once the one or more high speed links are operational, normal communication commences over the trained buss(es), and the slow commands are generally no longer utilized due to their inherent slow speed operation As shown in the FIG. 13, the "Slow Command Decode" combination is "001" (bits C0-C2, shown in the first column of the table). As is shown in the table, 4 slow command decodes are utilized by an exemplary embodiment, including a "Read Slow Data Buffer" command having a decode of "00" on bits 3 and 4 of the transfer (second column of the table), a "Write Slow Address/Data Buffer" command having a decode of "01", a "Read SCOM Register to Slow Data Buffer" command having a decode of "10", and a "Write SCOM Register from Slow Data Buffer" command having a decode of "11". As used herein, SCOM stands for Scan COMmunications—referring to the previously defined serial communication paths that connect registers and other logic elements within the hub device, thereby permitting information to be scanned in or out of these circuits in response to slow commands as well as during IAP, self-test operations, error recovery, etc. In an exemplary embodiment, the slow command decodes are located on bits C3-C4. The "Type" field indicates that the commands are "slow commands", and as such, will operate in the manner previously taught (IDLE- Command-IDLE, with each decode present for 8 transfers—although in the case of IDLE commands preceding and following the read or write command, the IDLE command may be present for more than 8 transfers).

FIG. 14 depicts a subset of three downstream frames consistent with FIG. 10A, with only those bits involved in the "Write Slow Address/Data Buffer" slow command operation described (e.g. those bits that will comprise bits C0-C7 and D0-D8, once a high speed frame is constructed for execution in the hub device). In this example of a "Write Slow Address/Data Buffer" operation, an IDLE command (C0-C2 set to "000") is sent for 8 transfers, followed by a "Slow Command" decode (C0-C2 set to "001", indicating that a slow command is present on the bus) for 8 transfers, followed by another IDLE command for 8 transfers (e.g., the sequence of IDLE-Command-IDLE is used). The specific slow command is present on bits C3 and C4 (the decode of "01" indicates a "Write Slow Address/Data Buffer" in the exemplary embodiment (consistent with FIG. 13), with the buffer pointer present on bits C5-C7 delineating the buffer number to which the information is to be stored (see FIG. 18). Bit D0 is used to indicate whether the data is to be stored in the address buffers 1808 or data buffers 1810, and the data to be written to the selected address or data buffer is present on bits D1-D8. Because there is no DIMM select field, all DIMMS in the cascaded channel will perform this operation.

FIG. 17 depicts a subset of three downstream frames consistent with FIG. 10A, with only those bits involved in the "Write SCOM Register from Slow Data Buffer" slow command operation, which includes only command bits C0-C7. The "Write SCOM Register from Slow Data Buffer" causes the transfer of data from the Slow Data Buffer (SDB) 1810 in FIG. 18 to the address stored in slow address buffer (SAB) 1808. The address located in SAB 1808 identifies one of many registers in the hub, all of which are considered as "SCOM" registers, due to the ability to scan data to and from these registers using the previously described internal scan path (further shown in FIG. 19). In the example of a "Write SCOM Register from Slow Data Buffer" operation depicted in FIG. 17, an IDLE command (C0-C2 set to "000") is sent for 8 transfers, followed by a "Slow Command" decode (C0-C2 set to "001", indicating that a slow command is present on the bus) for 8 transfers, followed by another IDLE command (e.g., the sequence of IDLE-Command-IDLE is used) for 8 transfers. The specific slow command is present on bits C3 and C4 (e.g. the decode of "11" indicates a "Write SCOM Register from Slow Data Buffer" in the exemplary embodiment), with the DIMM selected present on bits C5-C7—thereby ensuring that only the selected DIMM completes the specified operation.

FIG. 15 depicts a subset of three downstream frames consistent with FIG. 10A, with only those bits involved in the "Read SCOM Register to Slow Data Buffer" slow command operation described (e.g. C0-C7). In this example of a "Read SCOM Register to Slow Data Buffer" operation, an IDLE command (C0-C2 set to "000") is sent for 8 transfers, followed by a "Slow Command" decode (C0-C2 set to "001", indicating that a slow command is present on the bus) for 8 transfers, followed by another IDLE command (e.g., the sequence of IDLE-Command-IDLE is used) for 8 transfers. The specific slow command is present on bits C3 and C4 (the decode of "10" indicates a "Read SCOM Register to Slow Data Buffer" in the exemplary embodiment), with the DIMM selected present on bits C5-C7 (to select one of up to 8 DIMMs). Using this operation, the contents of an internal hub register containing one or more of configuration data, memory device data (e.g. data received from a memory device resulting from a prior command sent to one or more memory devices as a result of one or more commands sent via "read" operations or other means), etc are transferred to a slow data buffer, thereby allowing for subsequent transfer of this information, via a slow read command, to one or more of another hub device, a memory controller or other attached device.

FIG. 16A depicts a subset of three downstream frames consistent with FIG. 10A, with only those bits involved in the "Read Slow Data Buffer" slow command operation described (e.g. C0-C7 and D0-D8). In this example of a "Read Slow Data Buffer" operation, an IDLE command (C0-C2 set to "000") is sent for 8 transfers, followed by a "Slow Command" decode (C0-C2 set to "001", indicating that a slow command is present on the bus) for 8 transfers, followed by another IDLE command (e.g., the sequence of IDLE-Command-IDLE is used) for 8 transfers. The specific slow command is present on bits C3 and C4 (the decode of "00" indicates a "Read Slow Data Buffer" in the exemplary embodiment), with the DIMM selected (e.g. the DIMM which will respond to the command) present on bits C5-C7), and a slow data buffer pointer (SDBP) present on bits D7-D8 to identify which slow data buffer to read. The SDBP consists of four decodes ("00", "01", "10" and "11") which identify one of four 16 bit portions of the 64 bit slow data buffer to return in the read data frame (bits DO0-DO15) (i.e., to be read out onto the high speed bus). FIG. 16B comprises a table defining the bits to be returned for each of the four decodes present on bits D7-D8 of FIG. 16A. As depicted in FIG. 16A, bits D0-D6 are not utilized by the "Read Slow Data Buffer" command, and are defined as "0" in the exemplary embodiment.

Figure 18:
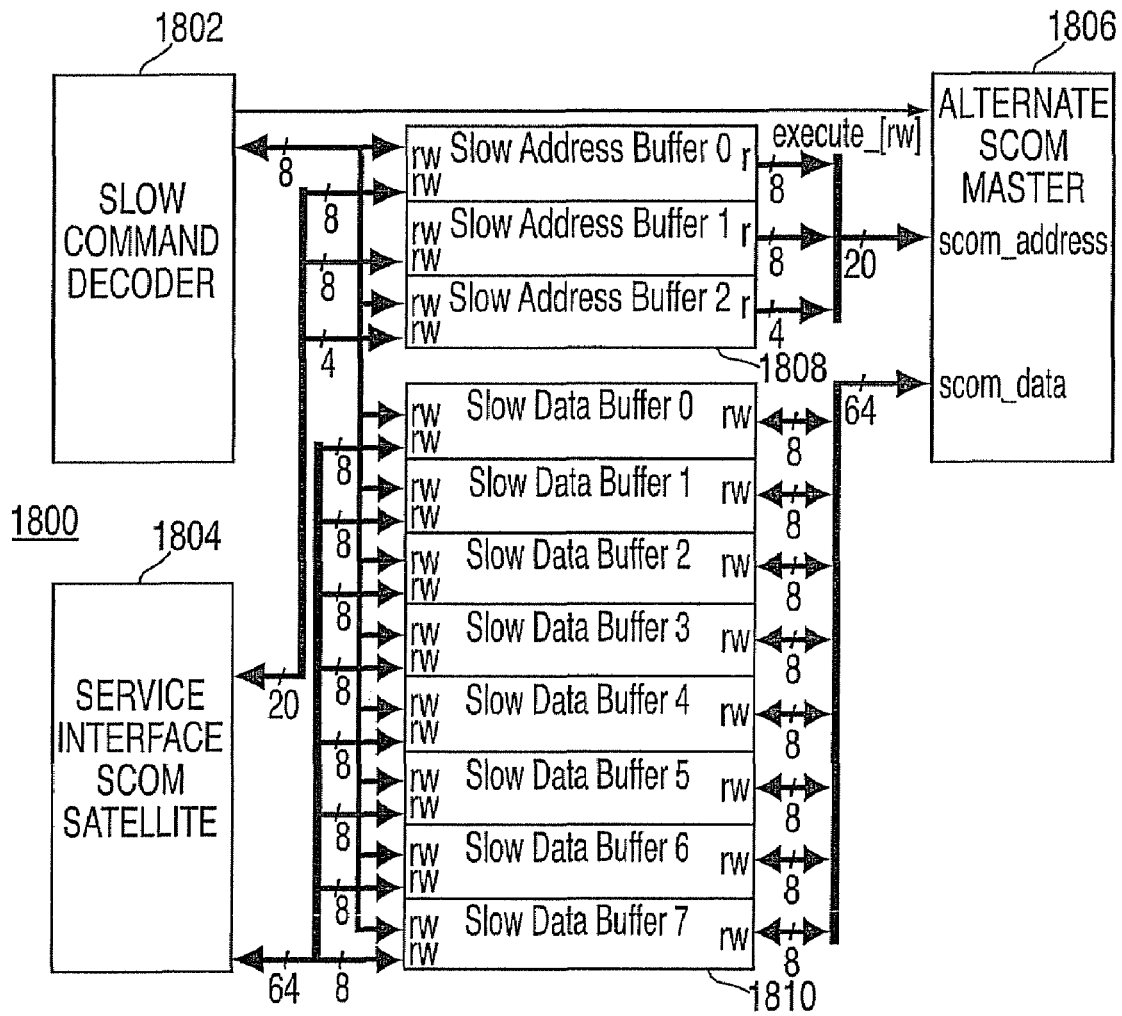
FIG. 18 is a block diagram of slow command circuitry that may be implemented by an exemplary embodiment.

FIG. 18 depicts a block diagram of slow command circuitry 1800 that may be implemented by an exemplary embodiment. The block diagram includes a slow command decoder 1802, a service interface SCOM satellite 1804, and an alternate SCOM master 1806, a 20 bit slow address buffer (SAB) 1808 made up of two-8 bit buffers and one 4 bit buffer, and a 64 bit slow data buffer (SDB) 1810 made up of eight-8 bit buffers. In an exemplary embodiment, slow commands are sent from the memory controller to the hub device (or memory interface device), received by receiver functional block 1124, passed through bus sparing logic block 1126 (which is in a reset state), passed though downstream bus ECC functional block 1120 (also in a reset state) to pervasive and miscellaneous functional block 1110 which contains slow command circuitry 1800. Once received by slow command decoder 1802, the slow command is decoded. Once decoded, the data sent on the bus will be placed in the SAB 1808 and SDB 1810 according to the information received. Once slow address and/or data buffers have been written consistent with the planned operation, other slow commands then can transfer the data from the buffers, using SCOM write commands and under the control of alternate SCOM master 1806, to the selected register(s) on the hub device. The SAB 1808 and SDB 1810 are, themselves, SCOM-accessible registers, and are accessible as such. Service SCOM satellite 1804 provides an alternate access means to the SAB 1808 and SDB 1810 buffers, for connection to an external interface such as JTAG or FSI—should this be available in a given application.

In an exemplary embodiment, slow commands are used to access internal registers in a hub device (e.g., hub device 504 in FIGS. 5 and 6) through a controller interface using an alternate SCOM master 1806 located in a pervasive and miscellaneous block (1910 in FIG. 19) in the hub device. In an exemplary embodiment, slow commands are sent from a memory controller to a hub device and decoded by the slow command decoder 1802. Once decoded, the data sent on the bus is placed in the SAB 1808 and/or SDB 1810 based on the results of the decoding. Because of the limited number of address and data bits that can be transferred during a slow command, two intermediary buffers, the 64 bit SDB 1810 and 20 bit SAB 1808 are used to temporarily store subsets of data and address that are ultimately used to transfer information to and from internal hub device registers. Slow commands are used to read and write from the SDB 1810 and SAB 1808.

The SDB 1810 and SAB 1808 can also be used to instruct the alternate SCOM master 1806 to execute a SCOM read using the address in the SAB 1808 and returning the read data to the SDB 1810. SCOM writes can also be executed through slow commands. The SCOM address source is the SAB 1808 while the write data comes from the SDB 1810. The SAB 1808 and the SDB 1810 are themselves SCOM accessible via the service interface SCOM satellite 1804. This allows the service interface to pre-load them with information that can be executed later by the appropriate slow command.

In an exemplary embodiment, slow commands are sent from a memory controller to a hub device and decoded by the slow command decoder 1802. Once decoded, the data sent on the bus is placed in the SAB 1808 and/or SDB 1810 based on the results of the decoding.

Figure 19:
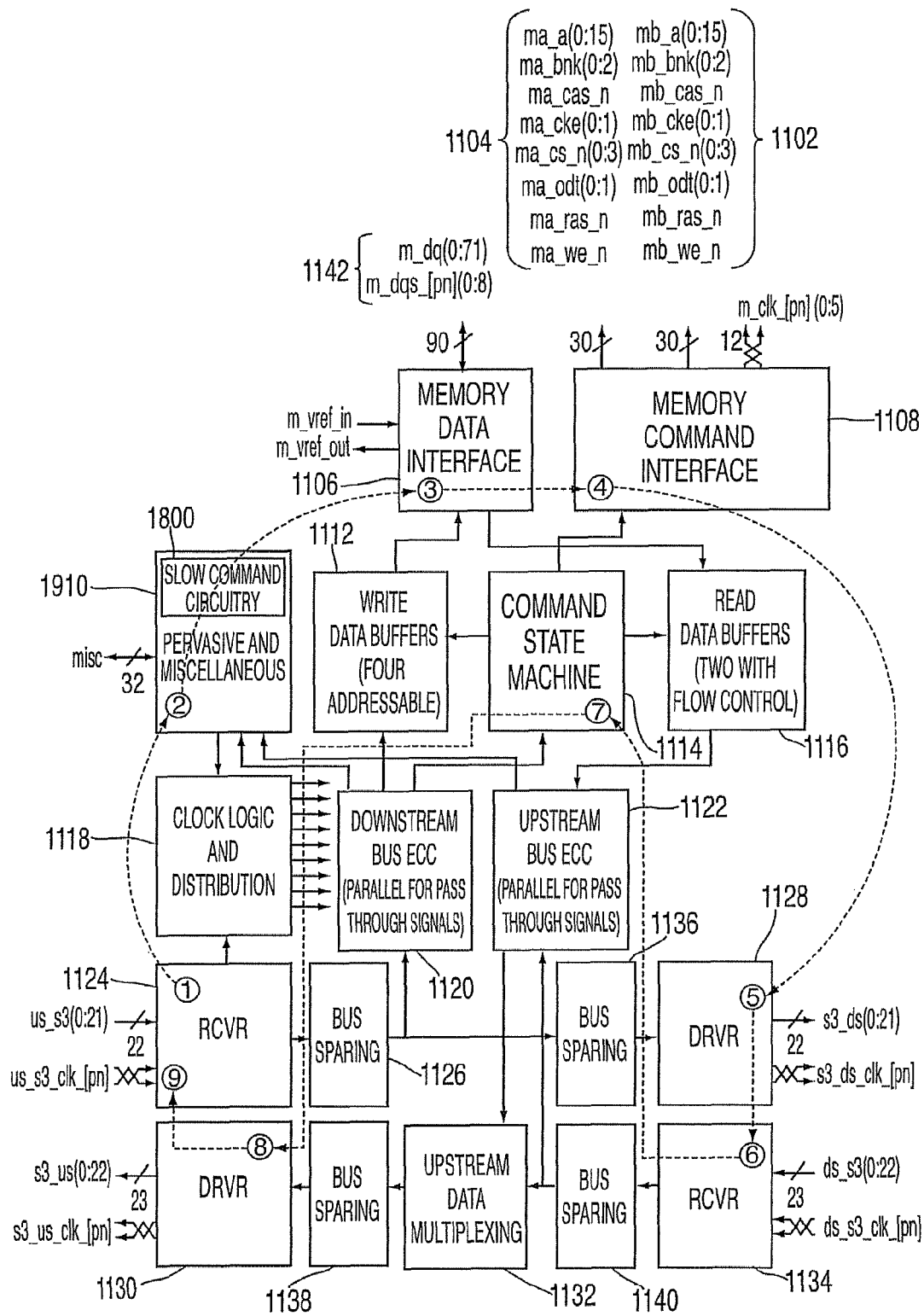
FIG. 19 is a high-level block diagram of a hub device that may be implemented by an exemplary embodiment.

FIG. 19 is a block diagram of the high level flow of a hub device, similar to the block diagram depicted in FIG. 11, with the addition of the slow command circuitry 1800 in the pervasive and miscellaneous functional block 1910. During slow command operation, writes can be completed to any of the SAB 1808 buffers and SDB 1810 buffers by selecting the buffer type to be written (address or data) and by selecting the appropriate buffer number (0-2 for address and 0-7 for data). By following this method, the full SAB 1808 and SDB 1810 contents can be written in 11 slow commands. In an exemplary embodiment, this would equate to 33 groups of 8 transfer periods, when command is preceded by and followed by an idle command (e.g. idle-cmd-idle-idle-cmd-idle . . . ). In an exemplary embodiment, the slow commands are received via the high speed bus from a memory controller (directly or via an upstream memory module) into the receiver functional block 1124. In an exemplary embodiment, the slow commands flow from the receiver functional block 1124 through the bus sparing logic block 1126 (inactive at this time) thru the downstream bus ECC functional block 1120 (inactive at this time) and to the pervasive and miscellaneous functional block 1910.

In the pervasive and miscellaneous functional block 1910, the SCOM master 1806 has access to all SCOM registers, including the memory data interface 1106, the memory command interface 1108, the downstream driver functional block 1128, the downstream receiver functional block 1134, the command state machine 1114 and loops back to the upstream driver functional block 1130 and the upstream receiver functional block 1124. The dotted line connecting these functional blocks in FIG. 19 depicts the path and order of this loop, which further describes the means by which information is transferred from the SAB 1808 and SDB 1810 buffers to SCOM registers located throughout the hub device. Although the exemplary embodiment described herein utilizes this internal BIST (Built-In-Self Test) serial loop as the method of passing slow command information through the hub circuitry, other methods can be used including other serial paths, the traditional (parallel) communication paths between the logic blocks, and the slow command decode can be completed in the command state machine 1114 with the slow command circuitry 1800 located in the command state machine 1114.

Once necessary information is received by internal hub registers, the hub device operates at normal speed to execute the one or more commands received. The exemplary embodiment therefore permits information to be transferred to and from one or more hub devices at a slow speed over untrained bus(es), where, upon completion of required transfers (e.g. a complete downstream frame is re-created), the hub device can operate at normal clock speed to execute the requested operation.

The block diagram in FIG. 19 is one implementation of a hub device that may be utilized by exemplary embodiments of the present invention. Other implementations are possible without departing from the scope of the present invention. As used herein, the terms "high speed link", "high speed interface" and "high speed bus" are used interchangeably.

As is evidenced by the slow command decode exemplary embodiments described herein, a viable solution is described for the register programming, interface training, hardware validation (including the hub device and memory devices) using existing untrained high speed link(s). Further, the exemplary embodiment utilizes circuitry generally already present in logic devices (e.g. scannable registers to facilitate logic device test, prior to sale and/or use) so that minimal additional circuitry is required to implement this function. Yet further, the exemplary solution permits complex memory systems/subsystems to be initialized and trained without the need for an external service processor or other JTAG or FSI-connected controller.

Although the exemplary embodiment defines specific bit positions to be used for the slow command indication, the command decode, the data/address indication and the buffer data, other bit combinations can be used and the content of the command may differ, without departing from the scope of the invention.

One benefit of the exemplary embodiment is that the slow commands can be processed either via the described use of the untrained high speed link(s) and/or via a separate test interface to the memory controller, processor or service processor—such as via a JTAG serial connection. In this manner, common circuitry can be used, and the affected circuitry can be de-powered when not in use.

In an exemplary embodiment, hub devices may be connected to the memory controller through a multi-drop or point-to-point bus structure (which may further include a cascade connection to one or more additional hub devices). Memory access requests are transmitted by the memory controller through the bus structure (e.g., the memory bus) to the selected hub(s). In response to receiving the memory access requests, the hub device translates the memory access requests to control the memory devices to store write data from the hub device or to provide read data to the hub device. Read data is encoded into one or more communication packet (s) and transmitted through the memory bus(ses) to the memory controller.

In alternate exemplary embodiments, the memory controller(s) may be integrated together with one or more processor chips and supporting logic, packaged in a discrete chip (commonly called a "northbridge" chip), included in a multi-chip carrier with the one or more processors and/or supporting logic, or packaged in various alternative forms that best match the application/environment. Any of these solutions may or may not employ one or more narrow/high speed links to connect to one or more hub chips and/or memory devices.

Figure 1:
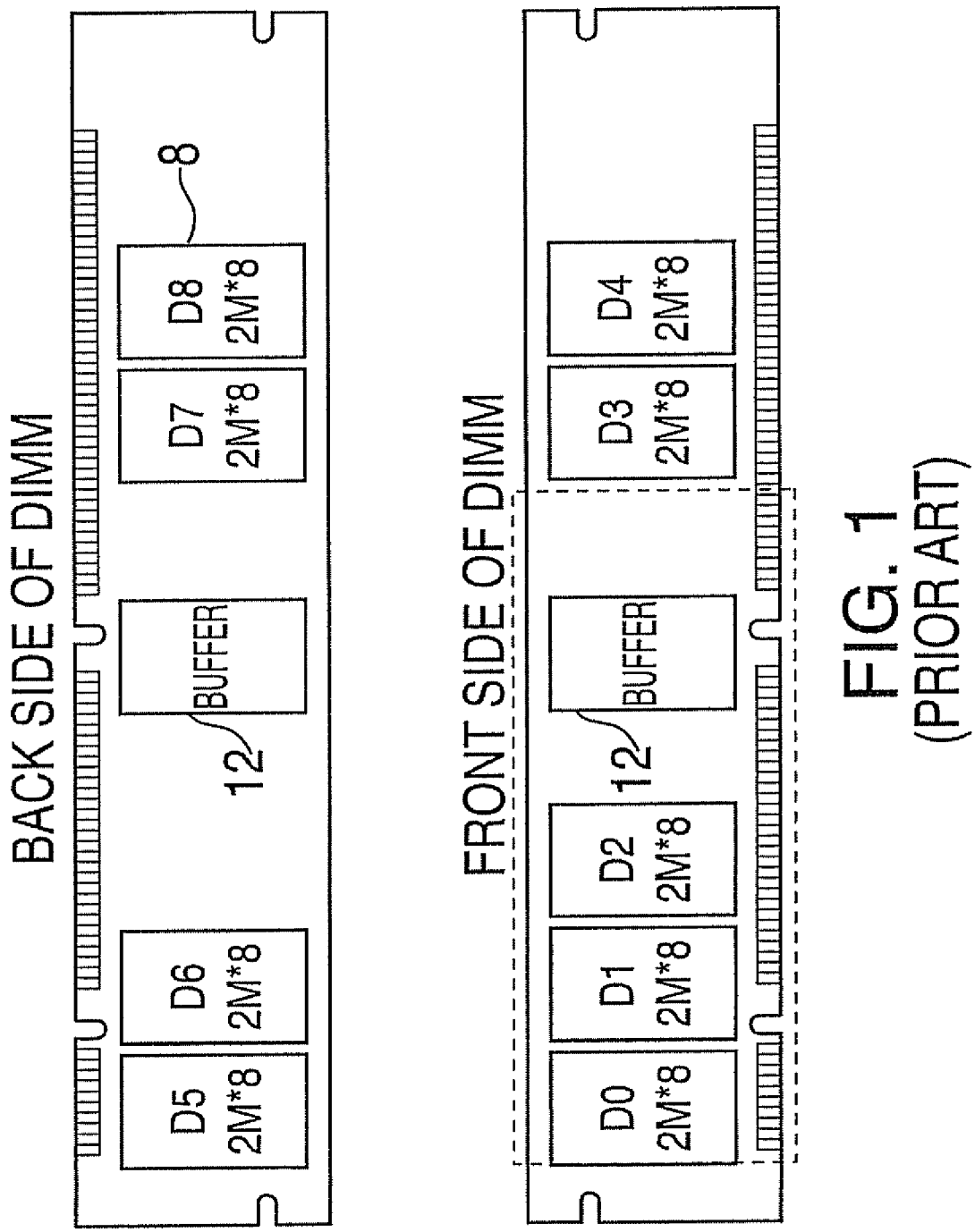
FIG. 1 depicts an early synchronous memory module.
Figure 2:
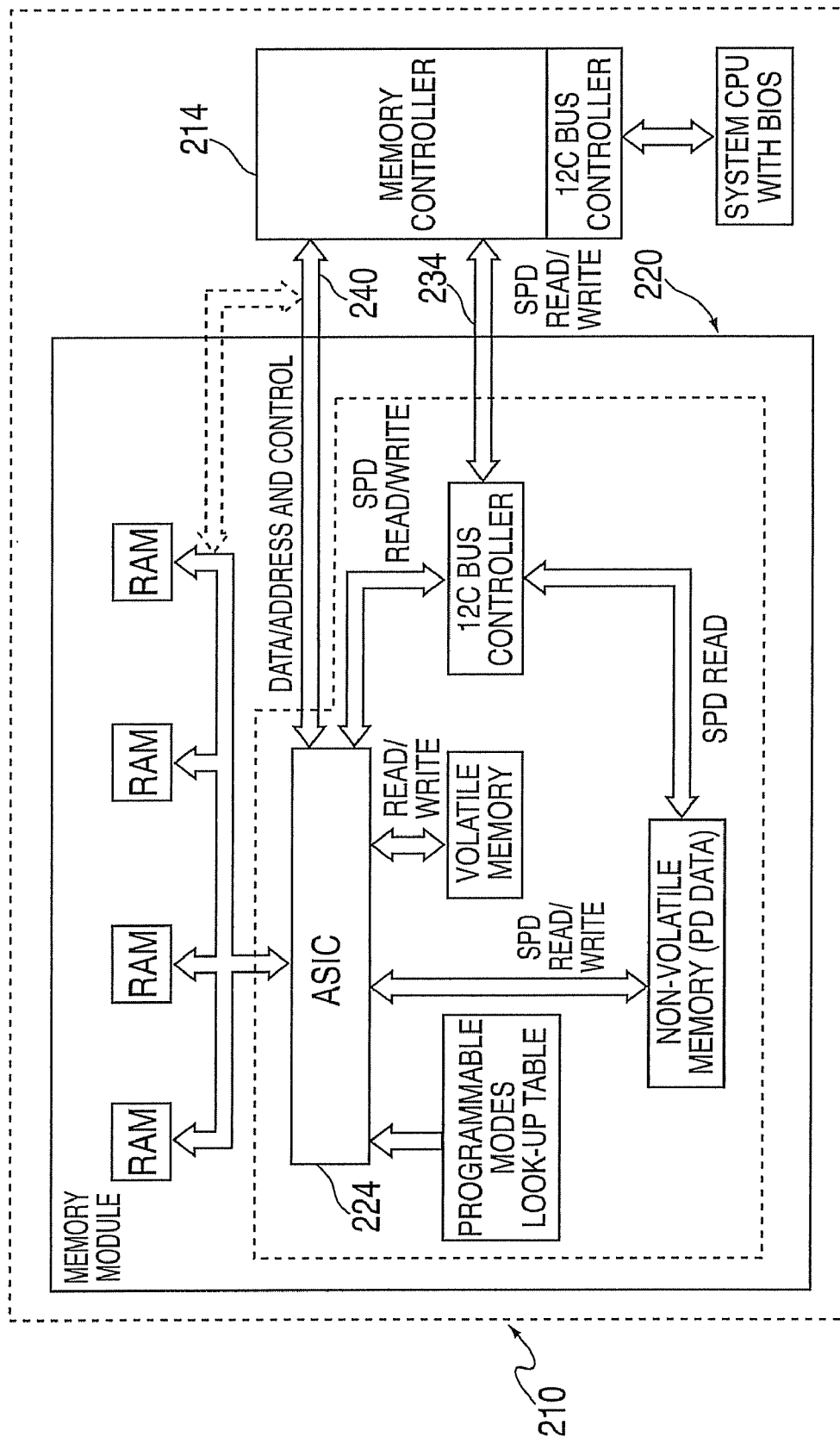
FIG. 2 depicts a computer system which includes a synchronous memory module that is directly connected to a memory controller.
Figure 3:
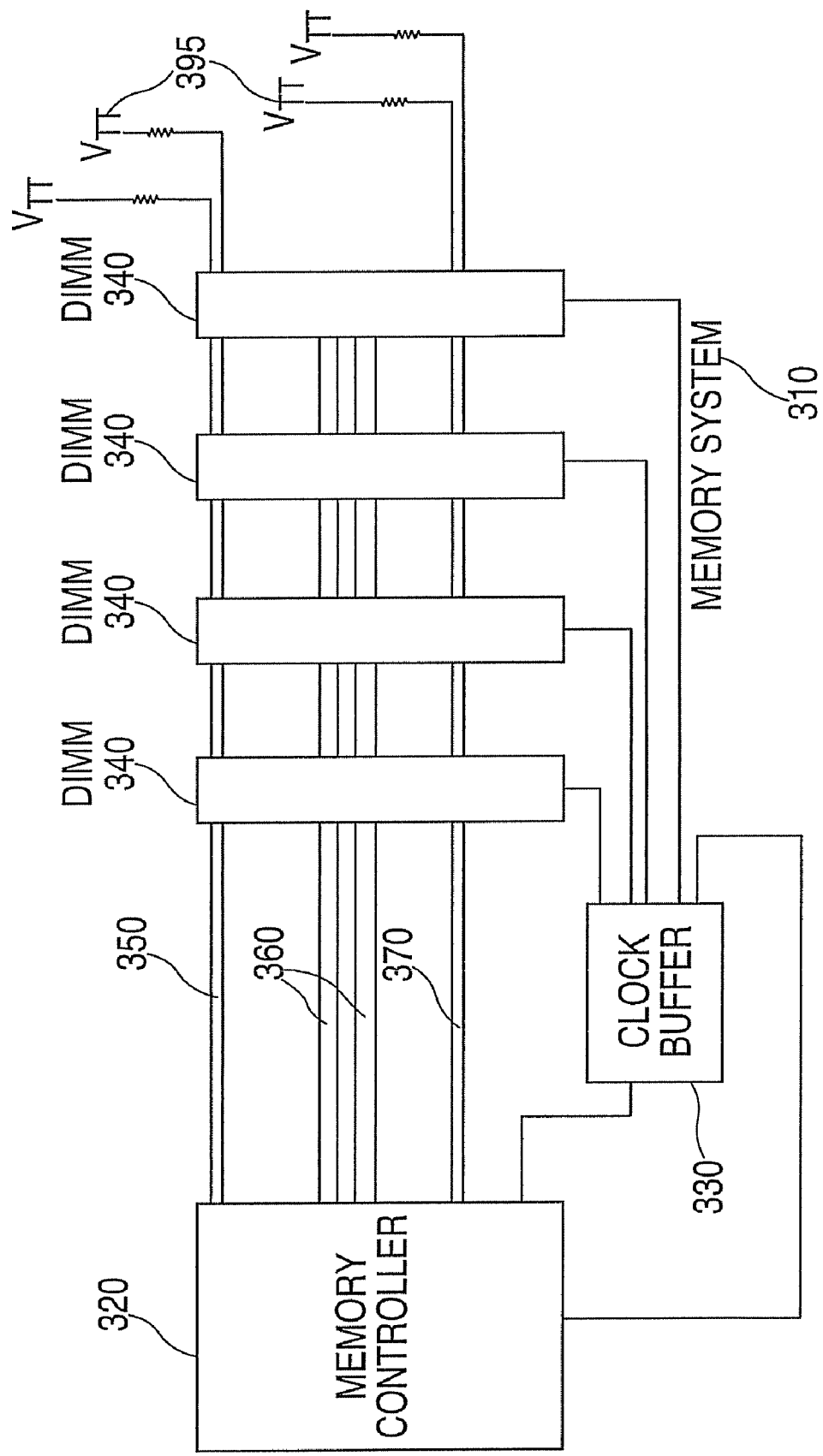
FIG. 3 depicts a memory system that includes DIMMs on a traditional multi-drop stub bus.
Figure 4:
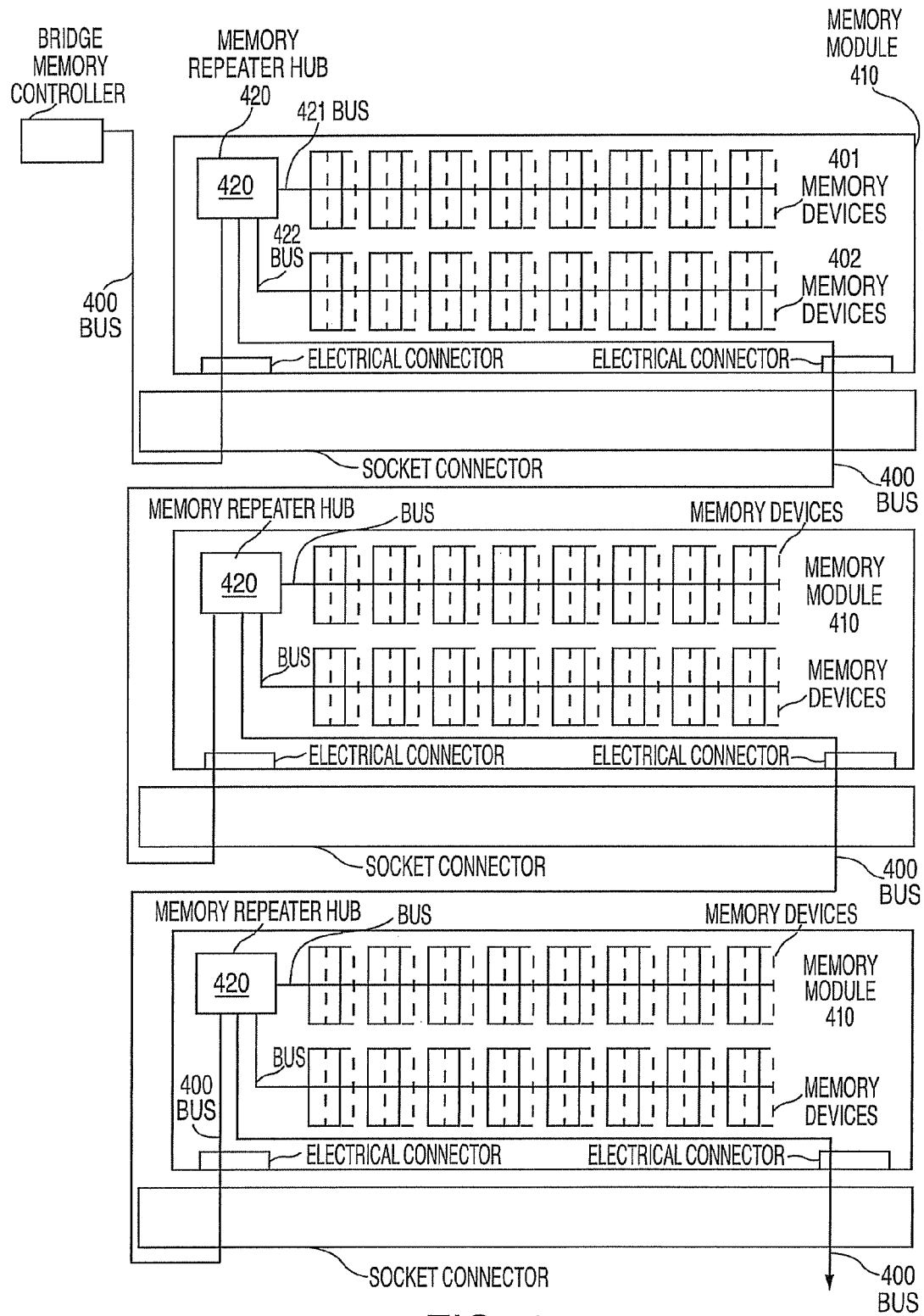
FIG. 4 depicts a synchronous memory module and system structure in which repeater hubs include local re-drive of address, command and data to the local memory devices.

The memory modules may be implemented by a variety of technology including a DIMM, a single in-line memory module (SIMM) and/or other memory module or card structures. In general, a DIMM refers to a small circuit board which is comprised primarily of random access memory (RAM) integrated circuits or die on one or both sides with signal and/or power pins on both sides of the board. This can be contrasted to a SIMM which is a small circuit board or substrate composed primarily of RAM integrated circuits or die on one or both sides and single row of pins along one long edge. The DIMM depicted in FIG. 1 includes 168 pins in the exemplary embodiment, whereas subsequent DIMMs have been constructed with pincounts ranging from 100 pins to over 300 pins. In exemplary embodiments described herein, memory modules may include two or more hub devices.

In exemplary embodiments, the memory bus is constructed using multi-drop connections to hub devices on the memory modules and/or using point-to-point connections. The downstream portion of the controller interface (or memory bus), referred to as the downstream bus, may include command, address, data and other operational, initialization or status information being sent to the hub devices on the memory modules. Each hub device may simply forward the information to the subsequent hub device(s) via bypass circuitry; receive, interpret and re-drive the information if it is determined to be targeting a downstream hub device; re-drive some or all of the information without first interpreting the information to determine the intended recipient; or perform a subset or combination of these options.

The upstream portion of the memory bus, referred to as the upstream bus, returns requested read data and/or error, status or other operational information, and this information may be forwarded to the subsequent hub devices via bypass circuitry; be received, interpreted and re-driven if it is determined to be targeting an upstream hub device and/or memory controller in the processor complex; be re-driven in part or in total without first interpreting the information to determine the intended recipient; or perform a subset or combination of these options.

In alternate exemplary embodiments, the point-to-point bus includes a switch or bypass mechanism which results in the bus information being directed to one of two or more possible hub devices during downstream communication (communication passing from the memory controller to a hub device on a memory module), as well as directing upstream information (communication from a hub device on a memory module to the memory controller), often by way of one or more upstream hub devices. Further embodiments include the use of continuity modules, such as those recognized in the art, which, for example, can be placed between the memory controller and a first populated hub device (i.e., a hub device that is in communication with one or more memory devices), in a cascade interconnect memory system, such that any intermediate hub device positions between the memory controller and the first populated hub device include a means by which information passing between the memory controller and the first populated hub device can be received even if the one or more intermediate hub device position(s) do not include a hub device. The continuity module(s) may be installed in any module position(s), subject to any bus restrictions, including the first position (closest to the main memory controller, the last position (prior to any included termination) or any intermediate position(s). The use of continuity modules may be especially beneficial in a multi-module cascade interconnect bus structure, where an intermediate hub device on a memory module is removed and replaced by a continuity module, such that the system continues to operate after the removal of the intermediate hub device. In more common embodiments, the continuity module(s) would include either interconnect wires to transfer all required signals from the input(s) to the corresponding output(s), or be re-driven through a repeater device.

The continuity module(s) might further include a non-volatile storage device (such as an EEPROM), but would not include main memory storage devices.

In exemplary embodiments, the memory system includes one or more hub devices on one or more memory modules connected to the memory controller via a cascade interconnect memory bus, however other memory structures may be implemented such as a point-to-point bus, a multi-drop memory bus or a shared bus. Depending on the signaling methods used, the target operating frequencies, space, power, cost, and other constraints, various alternate bus structures may be considered. A point-to-point bus may provide the optimal performance in systems produced with electrical interconnections, due to the reduced signal degradation that may occur as compared to bus structures having branched signal lines, switch devices, or stubs. However, when used in systems requiring communication with multiple devices or subsystems, this method will often result in significant added component cost and increased system power, and may reduce the potential memory density due to the need for intermediate buffering and/or re-drive.

Although not shown in the Figures, the memory modules or hub devices may also include a separate bus, such as a 'presence detect' bus, an I2C bus and/or an SMBus which is used for one or more purposes including the determination of the hub device an/or memory module attributes (generally after power-up), the reporting of fault or status information to the system, the configuration of the hub device(s) and/or memory subsystem(s) after power-up or during normal operation or other purposes. Depending on the bus characteristics, this bus might also provide a means by which the valid completion of operations could be reported by the hub devices and/or memory module(s) to the memory controller (s), or the identification of failures occurring during the execution of the main memory controller requests.

Performances similar to those obtained from point-to-point bus structures can be obtained by adding switch devices. These and other solutions offer increased memory packaging density at lower power, while retaining many of the characteristics of a point-to-point bus. Multi-drop busses provide an alternate solution, albeit often limited to a lower operating frequency, but at a cost/performance point that may be advantageous for many applications. Optical bus solutions permit significantly increased frequency and bandwidth potential, either in point-to-point or multi-drop applications, but may incur cost and space impacts.

As used herein the term "buffer" or "buffer device" refers to a temporary storage unit (as in a computer), especially one that accepts information at one rate and delivers it another. In exemplary embodiments, a buffer is an electronic device that provides compatibility between two signals (e.g., changing voltage levels or current capability). The term "hub" is sometimes used interchangeably with the term "buffer." A hub is a device containing multiple ports that is connected to several other devices. A port is a portion of an interface that serves a congruent I/O functionality (e.g., a port may be utilized for sending and receiving data, address, and control information over one of the point-to-point links, or busses). A hub may be a central device that connects several systems, subsystems, or networks together. A passive hub may simply forward messages, while an active hub, or repeater, amplifies and refreshes the stream of data which otherwise would deteriorate over a distance. The term hub device, as used herein, refers to a hub chip that includes logic (hardware and/or software) for performing memory functions.

Also as used herein, the term "bus" refers to one of the sets of conductors (e.g., wires, and printed circuit board traces or connections in an integrated circuit) connecting two or more functional units in a computer. The data bus, address bus and control signals, despite their names, constitute a single bus since each are often useless without the others. A bus may include a plurality of signal lines, each signal line having two or more connection points, that form a main transmission path that electrically connects two or more transceivers, transmitters and/or receivers. The term "bus" is contrasted with the term "channel" which is often used to describe the function of a "port" as related to a memory controller in a memory system, and which may include one or more busses or sets of busses. The term "channel" as used herein refers to a port on a memory controller. Note that this term is often used in conjunction with I/O or other peripheral equipment, however the term channel has been adopted by some to describe the interface between a processor or memory controller and one of one or more memory subsystem(s).

Further, as used herein, the term "daisy chain" refers to a bus wiring structure in which, for example, device A is wired to device B, device B is wired to device C, etc. The last device is typically wired to a resistor or terminator. All devices may receive identical signals or, in contrast to a simple bus, each device may modify one or more signals before passing them on. A "cascade" or cascade interconnect' as used herein refers to a succession of stages or units or a collection of interconnected networking devices, typically hubs, in which the hubs operate as a logical repeater, further permitting merging data to be concentrated into the existing data stream. Also as used herein, the term "point-to-point" bus and/or link refers to one or a plurality of signal lines that may each include one or more terminators. In a point-to-point bus and/or link, each signal line has two transceiver connection points, with each transceiver connection point coupled to transmitter circuitry, receiver circuitry or transceiver circuitry. A signal line refers to one or more electrical conductors or optical carriers, generally configured as a single carrier or as two or more carriers, in a twisted, parallel, or concentric arrangement, used to transport at least one logical signal.

Memory devices are generally defined as integrated circuits that are composed primarily of memory (storage) cells, such as DRAMs (Dynamic Random Access Memories), SRAMs (Static Random Access Memories), FeRAMs (Ferro-Electric RAMs), MRAMs (Magnetic Random Access Memories), Flash Memory and other forms of random access and related memories that store information in the form of electrical, optical, magnetic, biological or other means. Dynamic memory device types may include asynchronous memory devices such as FPM DRAMs (Fast Page Mode Dynamic Random Access Memories), EDO (Extended Data Out) DRAMs, BEDO (Burst EDO) DRAMs, SDR (Single Data Rate) Synchronous DRAMs, DDR (Double Data Rate) Synchronous DRAMs or any of the expected follow-on devices such as DDR2, DDR3, DDR4 and related technologies such as Graphics RAMs, Video RAMs, LP RAM (Low Power DRAMs) which are often based on the fundamental functions, features and/or interfaces found on related DRAMs.

Memory devices may be utilized in the form of chips (die) and/or single or multi-chip packages of various types and configurations. In multi-chip packages, the memory devices may be packaged with other device types such as other memory devices, logic chips, analog devices and programmable devices, and may also include passive devices such as resistors, capacitors and inductors. These packages may include an integrated heat sink or other cooling enhancements, which may be further attached to the immediate carrier or another nearby carrier or heat removal system.

Module support devices (such as buffers, hubs, hub logic chips, registers, PLL's, DLL's, non-volatile memory, etc) may be comprised of multiple separate chips and/or components, may be combined as multiple separate chips onto one or more substrates, may be combined onto a single package or even integrated onto a single device—based on technology, power, space, cost and other tradeoffs. In addition, one or more of the various passive devices such as resistors, capacitors may be integrated into the support chip packages, or into the substrate, board or raw card itself, based on technology, power, space, cost and other tradeoffs. These packages may include an integrated heat sink or other cooling enhancements, which may be further attached to the immediate carrier or another nearby carrier or heat removal system.

Memory devices, hubs, buffers, registers, clock devices, passives and other memory support devices and/or components may be attached to the memory subsystem and/or hub device via various methods including solder interconnects, conductive adhesives, socket structures, pressure contacts and other methods which enable communication between the two or more devices via electrical, optical or alternate means.

The one or more memory modules (or memory subsystems) and/or hub devices may be electrically connected to the memory system, processor complex, computer system or other system environment via one or more methods such as soldered interconnects, connectors, pressure contacts, conductive adhesives, optical interconnects and other communication and power delivery methods. Connector systems may include mating connectors (male/female), conductive contacts and/or pins on one carrier mating with a male or female connector, optical connections, pressure contacts (often in conjunction with a retaining mechanism) and/or one or more of various other communication and power delivery methods. The interconnection(s) may be disposed along one or more edges of the memory assembly and/or placed a distance from an edge of the memory subsystem depending on such application requirements as ease-of-upgrade/repair, available space/volume, heat transfer, component size and shape and other related physical, electrical, optical, visual/physical access, etc. Electrical interconnections on a memory module are often referred to as contacts, or pins, or tabs. Electrical interconnections on a connector are often referred to as contacts or pins.

As used herein, the term memory subsystem refers to, but is not limited to: one or more memory devices; one or more memory devices and associated interface and/or timing/control circuitry; and/or one or more memory devices in conjunction with a memory buffer, hub device, and/or switch. The term memory subsystem may also refer to one or more memory devices, in addition to any associated interface and/or timing/control circuitry and/or a memory buffer, hub device or switch, assembled into a substrate, a card, a module or related assembly, which may also include a connector or similar means of electrically attaching the memory subsystem with other circuitry. The memory modules described herein may also be referred to as memory subsystems because they include one or more memory devices and hub devices Additional functions that may reside local to the memory subsystem and/or hub device include write and/or read buffers, one or more levels of memory cache, local pre-fetch logic, data encryption/decryption, compression/decompression, protocol translation, command prioritization logic, voltage and/or level translation, error detection and/or correction circuitry, data scrubbing, local power management circuitry and/or reporting, operational and/or status registers, initialization circuitry, performance monitoring and/or control, one or more co-processors, search engine(s) and other functions that may have previously resided in other memory subsystems. By placing a function local to the memory subsystem, added performance may be obtained as related to the specific function, often while making use of unused circuits within the subsystem.

Memory subsystem support device(s) may be directly attached to the same substrate or assembly onto which the memory device(s) are attached, or may be mounted to a separate interposer or substrate also produced using one or more of various plastic, silicon, ceramic or other materials which include electrical, optical or other communication paths to functionally interconnect the support device(s) to the memory device(s) and/or to other elements of the memory or computer system.

Information transfers (e.g. packets) along a bus, channel, link or other naming convention applied to an interconnection method may be completed using one or more of many signaling options. These signaling options may include such methods as single-ended, differential, optical or other approaches, with electrical signaling further including such methods as voltage or current signaling using either single or multi-level approaches. Signals may also be modulated using such methods as time or frequency, non-return to zero, phase shift keying, amplitude modulation and others. Voltage levels are expected to continue to decrease, with 1.5V, 1.2V, 1V and lower signal voltages expected consistent with (but often independent of) the reduced power supply voltages required for the operation of the associated integrated circuits themselves.

One or more clocking methods may be utilized within the memory subsystem and the memory system itself, including global clocking, source-synchronous clocking, encoded clocking or combinations of these and other methods. The clock signaling may be identical to that of the signal lines themselves, or may utilize one of the listed or alternate methods that is more conducive to the planned clock frequency (ies), and the number of clocks planned within the various subsystems. A single clock may be associated with all communication to and from the memory, as well as all clocked functions within the memory subsystem, or multiple clocks may be sourced using one or more methods such as those described earlier. When multiple clocks are used, the functions within the memory subsystem may be associated with a clock that is uniquely sourced to the subsystem, or may be based on a clock that is derived from the clock related to the information being transferred to and from the memory subsystem (such as that associated with an encoded clock). Alternately, a unique clock may be used for the information transferred to the memory subsystem, and a separate clock for information sourced from one (or more) of the memory subsystems. The clocks themselves may operate at the same or frequency multiple of the communication or functional frequency, and may be edge-aligned, center-aligned or placed in an alternate timing position relative to the data, command or address information.

Information passing to the memory subsystem(s) will generally be composed of address, command and data, as well as other signals generally associated with requesting or reporting status or error conditions, resetting the memory, completing memory or logic initialization and other functional, configuration or related information. Information passing from the memory subsystem(s) may include any or all of the information passing to the memory subsystem(s), however generally will not include address and command information. This information may be communicated using communication methods that may be consistent with normal memory device interface specifications (generally parallel in nature), the information may be encoded into a 'packet' structure, which may be consistent with future memory interfaces or simply developed to increase communication bandwidth and/or enable the subsystem to operate independently of the memory technology by converting the received information into the format required by the receiving device(s).

Initialization of the memory subsystem may be completed via one or more methods, based on the available interface busses, the desired initialization speed, available space, cost/complexity objectives, subsystem interconnect structures, the use of alternate processors (such as a service processor) which may be used for this and other purposes, etc. In one embodiment, the high speed bus may be used to complete the initialization of the memory subsystem(s), generally by first completing a training process to establish reliable communication, then by interrogation of the attribute or 'presence detect' data associated the various components and/or characteristics associated with that subsystem, and ultimately by programming the appropriate devices with information associated with the intended operation within that system. In a cascaded system, communication with the first memory subsystem would generally be established, followed by subsequent (downstream) subsystems in the sequence consistent with their position along the cascade interconnect bus.

A second initialization method would include one in which the high speed bus is operated at one frequency during the initialization process, then at a second (and generally higher) frequency during the normal operation. In this embodiment, it may be possible to initiate communication with all of the memory subsystems on the cascade interconnect bus prior to completing the interrogation and/or programming of each subsystem, due to the increased timing margins associated with the lower frequency operation.

A third initialization method might include operation of the cascade interconnect bus at the normal operational frequency (ies), while increasing the number of cycles associated with each address, command and/or data transfer. In one embodiment, a packet containing all or a portion of the address, command and/or data information might be transferred in one clock cycle during normal operation, but the same amount and/or type of information might be transferred over two, three or more cycles during initialization. This initialization process would therefore be using a form of 'slow' commands, rather than 'normal' commands, and this mode might be automatically entered at some point after power-up and/or re-start by each of the subsystems and the memory controller by way of POR (power-on-reset) logic included in each of these subsystems.

A fourth initialization method might utilize a distinct bus, such as a presence detect bus (such as the one defined in U.S. Pat. No. 5,513,135 to Dell et al., of common assignment herewith), an I2C bus (such as defined in published JEDEC standards such as the 168 Pin DIMM family in publication 21-C revision 7R8) and/or the SMBUS, which has been widely utilized and documented in computer systems using such memory modules. This bus might be connected to one or more modules within a memory system in a daisy chain/cascade interconnect, multi-drop or alternate structure, providing an independent means of interrogating memory subsystems, programming each of the one or more memory subsystems to operate within the overall system environment, and adjusting the operational characteristics at other times during the normal system operation based on performance, thermal, configuration or other changes desired or detected in the system environment.

Other methods for initialization can also be used, in conjunction with or independent of those listed. The use of a separate bus, such as described in the fourth embodiment above, also offers the advantage of providing an independent means for both initialization and uses other than initialization, such as described in U.S. Pat. No. 6,381,685 to Dell et al., of common assignment herewith, including changes to the subsystem operational characteristics on-the-fly and for the reporting of and response to operational subsystem information such as utilization, temperature data, failure information or other purposes.

With improvements in lithography, better process controls, the use of materials with lower resistance, increased field sizes and other semiconductor processing improvements, increased device circuit density (often in conjunction with increased die sizes) will help facilitate increased function on integrated devices as well as the integration of functions previously implemented on separate devices. This integration will serve to improve overall performance of the intended function, as well as promote increased storage density, reduced power, reduced space requirements, lower cost and other manufacturer and customer benefits. This integration is a natural evolutionary process, and may result in the need for structural changes to the fundamental building blocks associated with systems.

The integrity of the communication path, the data storage contents and all functional operations associated with each element of a memory system or subsystem can be assured, to a high degree, with the use of one or more fault detection and/or correction methods. Any or all of the various elements may include error detection and/or correction methods such as CRC (Cyclic Redundancy Code), EDC (Error Detection and Correction), parity or other encoding/decoding methods suited for this purpose. Further reliability enhancements may include operation re-try (to overcome intermittent faults such as those associated with the transfer of information), the use of one or more alternate or replacement communication paths to replace failing paths and/or lines, complement-re-complement techniques or alternate methods used in computer, communication and related systems.

The use of bus termination, on busses as simple as point-to-point links or as complex as multi-drop structures, is becoming more common consistent with increased performance demands. A wide variety of termination methods can be identified and/or considered, and include the use of such devices as resistors, capacitors, inductors or any combination thereof, with these devices connected between the signal line and a power supply voltage or ground, a termination voltage or another signal. The termination device(s) may be part of a passive or active termination structure, and may reside in one or more positions along one or more of the signal lines, and/or as part of the transmitter and/or receiving device(s). The terminator may be selected to match the impedance of the transmission line, or selected via an alternate approach to maximize the useable frequency, operating margins and related attributes within the cost, space, power and other constraints.

Technical effects and benefits include the ability to use interface(s) which require training/calibration prior to conventional operation, through the use of slow command decodes, where said interfaces are operable prior to running an interface alignment procedure for such operations as the configuration of internal registers through the use of the slow command decodes. Benefits and technical effects further relate to memory subsystems, memory systems and computer systems which include the use of slow command decodes as described herein.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A memory system comprising:
    a memory interface device;
    an untrained high-speed interface in communication with the memory interface device; and
    a memory controller for generating slow commands and for transmitting the slow commands to the memory interface device via the untrained high-speed interface, the slow commands operating at a first data rate that is slower than a second data rate utilized by the high-speed interface after it has been trained;
    the memory interface device including circuitry for receiving the slow commands via the untrained high-speed interface at the first data rate, decoding the slow commands, and executing the slow commands, wherein a decode of a portion of a command identifies the command as a slow command and an other portion of the command includes information utilized for training of the untrained high-speed interface, the training including modifying one or more of drive strength, receiver capture timing and bus termination.

2. The memory system of claim 1 wherein the memory interface device enables execution of the commands via one or more serial communication paths between one or more internal registers and buffers that exist on the memory interface device for other purposes, the execution enabled by transferring the received commands to one or more of the internal registers and buffers.

3. The memory system of claim 1 wherein the memory interface device includes a slow address buffer and a slow data buffer for storing data associated with one or more of the slow commands.

4. The memory system of claim 3 wherein one or more of the slow commands cause data to be transferred onto the untrained high-speed interface from one or more of the slow address buffer and the slow data buffer.

5. The memory system of claim 3 wherein one or more of the slow commands cause data to be written to one or more of the slow address buffer and the slow data buffer.

6. The memory system of claim 3 wherein the memory interface device further includes one or more configuration registers.

7. The memory system of claim 6 wherein one or more of the slow commands transfers data from one or more of the slow address buffer and the slow data buffer into one or more of the configuration registers.

8. The memory system of claim 6 wherein one or more of the slow commands transfers data from one or more of the configuration registers into one or more of the slow address buffer and the slow data buffer.

9. The memory system of claim 1 wherein the identification of a valid slow command includes monitoring one or more bits on the untrained high speed bus for a change in value.

10. The memory system of claim 1 wherein one or more of the slow commands initiate an interface alignment procedure to train the untrained high-speed interface.

11. The memory system of claim 1 wherein one or more of the slow commands initiate a calibration process to train the untrained high-speed interface.

12. A hub device in a memory system, the hub device comprising:
   a connection to an high-speed interface; and
   slow command decode circuitry including logic for:
      receiving slow commands over the high-speed interface, the slow commands operating at a first data rate that is slower than a second data rate utilized by the high-speed interface after it has been trained;
      decoding the slow commands, wherein a decode of a portion of a command identifies the command as a slow command and an other portion of the command includes information utilized for training of the untrained high-speed interface, the training including modifying one or more of drive strength, receiver capture timing and bus termination; and
      executing the slow commands.

13. The hub device of claim 12 wherein the executing the slow commands utilizes one or more serial communications paths between one or more internal registers and buffers that exist on the hub device for other purposes.

14. The hub device of claim 12 wherein the hub device further includes a slow address buffer and a slow data buffer for storing data associated with one or more of the slow commands.

15. The hub device of claim 14 wherein one or more of the slow commands cause data to be transferred onto the untrained high-speed interface from one or more of the slow address buffer and the slow data buffer.

16. The hub device of claim 14 wherein one or more of the slow commands cause data to be written to one or more of the slow address buffer and the slow data buffer.

17. The hub device of claim 14 wherein the hub device further includes one or more configuration registers and one or more of the slow commands reads data from one or more of the slow address buffer and the slow data buffer into one or more of the configuration registers.

18. The hub device of claim 14 wherein information present in one or more of the slow address buffer and slow data buffer are transferred to one or more internal registers or buffers in the hub device, and wherein the hub device circuits receiving the information are operable at normal speed.

19. The hub device of claim 14 wherein the identification of a valid slow command includes monitoring one or more bits on the untrained high speed bus for a change in value.

20. A memory module comprising:
   a plurality of memory devices; and
   a memory interface device in communication with the memory devices via a first interface and in communication with a memory controller via a high-speed interface, the memory interface device including slow command circuitry for:
      receiving slow commands over the high-speed interface when the high-speed interface is in an untrained state, the slow commands operating at a first data rate that is slower than a second data rate utilized by the high-speed interface after it has been trained;
      decoding the slow commands, wherein a decode of a portion of a command identifies the command as a slow command and an other portion of the command includes information utilized for training of the untrained high-speed interface, the training including modifying one or more of drive strength, receiver capture timing and bus termination; and
      executing the slow commands.

* * * * *